(12) United States Patent
Kobayashi et al.

(10) Patent No.: US 10,114,276 B2
(45) Date of Patent: Oct. 30, 2018

(54) PHOSPHOR WHEEL, LIGHT SOURCE APPARATUS, AND PROJECTION-TYPE DISPLAY APPARATUS

(71) Applicant: SONY CORPORATION, Tokyo (JP)

(72) Inventors: Izushi Kobayashi, Tokyo (JP); Masahiro Ishige, Kanagawa (JP); Yuki Maeda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/512,659

(22) PCT Filed: Jul. 16, 2015

(86) PCT No.: PCT/JP2015/070377
§ 371 (c)(1),
(2) Date: Mar. 20, 2017

(87) PCT Pub. No.: WO2016/056285
PCT Pub. Date: Apr. 14, 2016

(65) Prior Publication Data
US 2017/0293211 A1    Oct. 12, 2017

(30) Foreign Application Priority Data

Oct. 10, 2014   (JP) .................................. 2014-208719

(51) Int. Cl.
*G03B 21/14* (2006.01)
*G03B 21/16* (2006.01)
(Continued)

(52) U.S. Cl.
CPC ............... *G03B 21/16* (2013.01); *F21V 9/16* (2013.01); *F21V 9/30* (2018.02); *F21V 14/08* (2013.01); *F21V 29/76* (2015.01); *G02B 26/008* (2013.01); *G03B 21/204* (2013.01); *G03B 33/12* (2013.01); *H04N 9/3144* (2013.01);
(Continued)

(58) Field of Classification Search
CPC . F21V 14/08; F21V 29/76; F21V 9/16; G02B 26/008; G03B 21/00; G03B 21/14; G03B 21/16; G03B 21/204; G03B 33/12; G03B 21/006; H04N 5/74; H04N 9/3144; H04N 9/3161; F21Y 2115/30
See application file for complete search history.

(56) References Cited

U.S. PATENT DOCUMENTS

2013/0048257 A1* 2/2013 Perry ...................... F28D 1/04
165/154

FOREIGN PATENT DOCUMENTS

JP    2010-073707 A    4/2010
JP    2010-220402 A    9/2010
(Continued)

*Primary Examiner* — Sultan Chowdhury
*Assistant Examiner* — Magda Cruz
(74) *Attorney, Agent, or Firm* — Chip Law Group

(57) ABSTRACT

An object of the present invention is to improve the efficiency of heat dissipation from a phosphor wheel while suppressing the air resistance and noise of the phosphor wheel during the driving of a light source apparatus. A phosphor wheel (100) according to the present invention includes: a disc-like substrate (120); a phosphor layer (130) formed on the substrate; and a plurality of heat dissipation fins (154a, 154b, and 154c) overlapping with each other when viewed in a direction orthogonal to a surface of the substrate.

20 Claims, 26 Drawing Sheets

(51) Int. Cl.
*F21V 29/76* (2015.01)
*F21V 14/08* (2006.01)
*F21V 9/16* (2006.01)
*G02B 26/00* (2006.01)
*H04N 9/31* (2006.01)
*G03B 21/20* (2006.01)
*G03B 33/12* (2006.01)
*F21V 9/30* (2018.01)
*G03B 21/00* (2006.01)
*F21Y 115/30* (2016.01)

(52) U.S. Cl.
CPC ........ *H04N 9/3161* (2013.01); *F21Y 2115/30* (2016.08); *G03B 21/006* (2013.01)

(56) References Cited

FOREIGN PATENT DOCUMENTS

| | | | | |
|---|---|---|---|---|
| JP | 2011-036104 A | 2/2011 | | |
| JP | 2012-008177 A | 1/2012 | | |
| JP | 2012-013897 A | 1/2012 | | |
| JP | 2012013897 A | * 1/2012 | ............ | G03B 21/14 |
| JP | 2012-169049 A | 9/2012 | | |
| JP | 2015-121586 A | 7/2015 | | |

\* cited by examiner

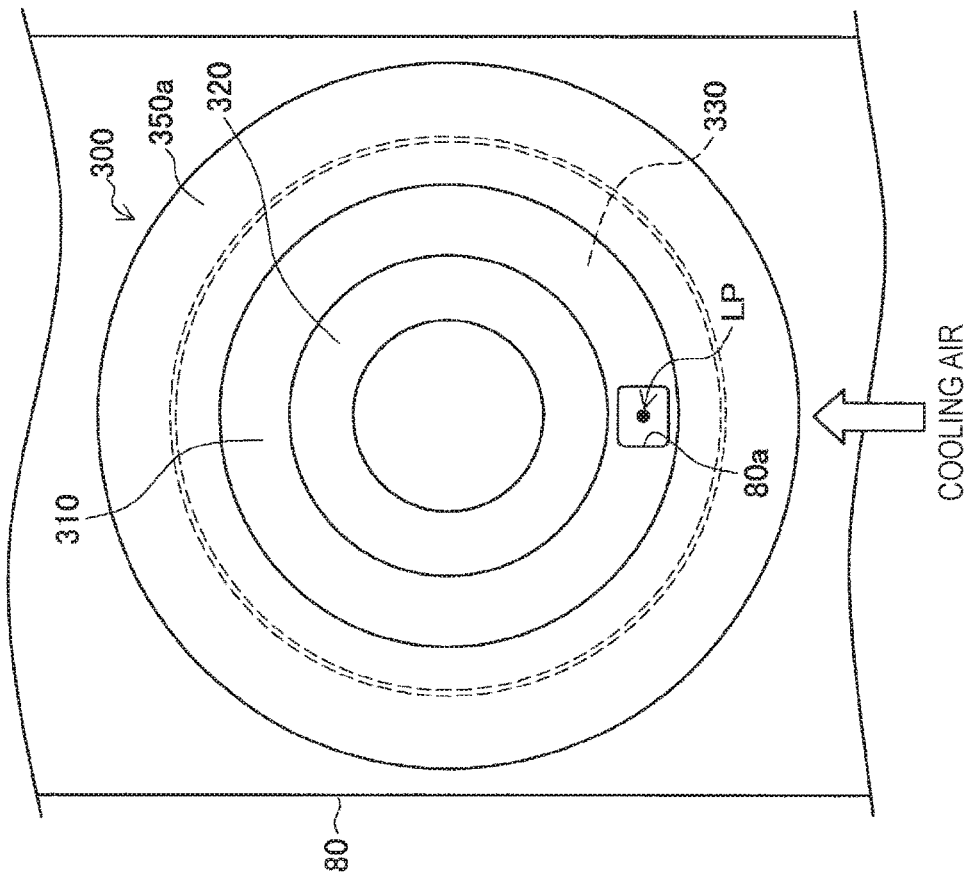
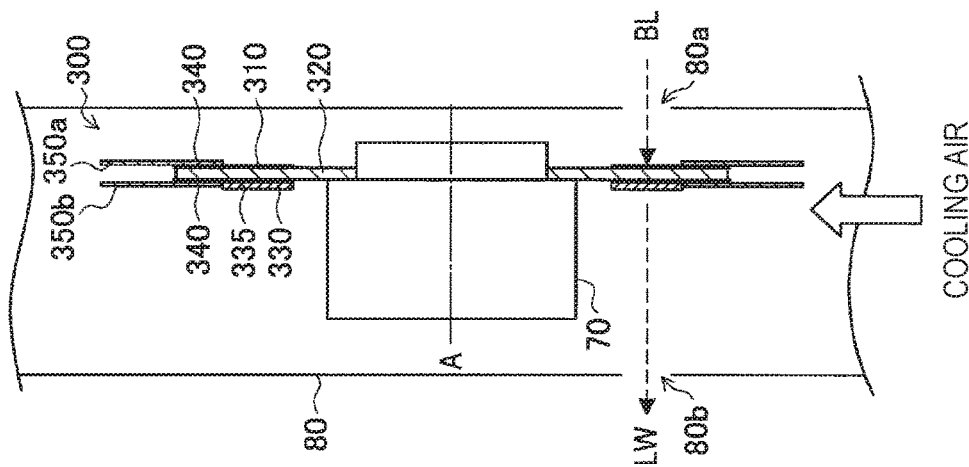
FIG. 22

PHOSPHOR WHEEL, LIGHT SOURCE APPARATUS, AND PROJECTION-TYPE DISPLAY APPARATUS

CROSS REFERENCE TO RELATED APPLICATIONS

This application is a U.S. National Phase of International Patent Application No. PCT/JP2015/070377 filed on Jul. 16, 2015, which claims priority benefit of Japanese Patent Application No. JP 2014-208719 filed in the Japan Patent Office on Oct. 10, 2014. Each of the above-reference applications is hereby incorporated herein by reference in its entirety.

TECHNICAL FIELD

The present disclosure relates to a phosphor wheel, a light source apparatus, and a projection-type display apparatus.

BACKGROUND ART

As a light source used for a projection-type display apparatus such as a projector, an ultra-high pressure mercury vapor lamp is mainly used from the viewpoints of brightness and cost performance, but a solid state light source having a long lifetime and a wide color range is drawing attention from the viewpoints of long lifetime characteristics, high functionality addition, etc. The solid state light source is a light source using a light emission phenomenon based on a p-n junction of semiconductors, and is typified by an LED, a laser (LD), and the like. These days, a light source apparatus in which a solid state light source is used to apply light to a phosphor material that, when irradiated with light in a specific wavelength range, emits light in a wavelength range different from the wavelength range of the applied light and the fluorescently emitted light is utilized is used for a projector and the like.

Such a light source apparatus includes a phosphor wheel on a surface of which a phosphor layer is formed and a solid state light source that emits excitation light. The light emission of the phosphor has the phenomena of luminance saturation and thermal quenching. This is an event in which, when the power of excitation light is increased, part of the conversion loss in the phosphor changes to heat and the phosphor generates heat, and consequently the efficiency of fluorescent emission is reduced. A bright light source apparatus with good efficiency cannot be obtained in the state where the fluorescence conversion efficiency is low. Hence, a technology in which a heat sink is attached to the phosphor wheel to improve the heat dissipation efficiency is proposed.

For example, Patent Literature 1 discloses a technology in which, in a color wheel in which a phosphor area for each of red, green, and blue is formed and that emits red light, green light, and blue light as fluorescence upon irradiation with excitation light, a heat dissipation unit is formed on the surface on the opposite side to the surface on which excitation light is incident. Further, Patent Literature 2 discloses a phosphor wheel in which, for a phosphor applied to a surface of a substrate, a heat sink is adhered to at least one of the inside and outside in the radius direction with respect to the phosphor so as to avoid the optical path of the light transmitted through the phosphor.

CITATION LIST

Patent Literature

Patent Literature 1: JP 2012-13897A
Patent Literature 2: JP 2012-8177A

DISCLOSURE OF INVENTION

Technical Problem

However, the heat dissipation unit described in Patent Literature 1 is composed of fins raised in a direction orthogonal to the substrate surface, and is likely to encounter air resistance during the rotation of the color wheel and cause large windage loss. Therefore, in the color wheel described in Patent Literature 1, the power consumption of the motor that rotationally drives the color wheel may be increased. Furthermore, in the color wheel described in Patent Literature 1, when the rotation rate is increased, the noise may be increased due to the air resistance encountered by the fins.

In the phosphor wheel described in Patent Literature 2, the heat sink is adhered to one surface of the substrate so as to be in contact with the phosphor; although the air resistance encountered by the heat sink is reduced, the surface area of the heat sink has a certain limit.

Thus, the present disclosure proposes a new and improved phosphor wheel, a new and improved light source apparatus, and a new and improved projection-type display apparatus that can improve the efficiency of heat dissipation from the phosphor wheel while suppressing the air resistance and noise of the phosphor wheel.

Solution to Problem

According to the present disclosure, there is provided a phosphor wheel including: a disc-like substrate; a phosphor layer formed on the substrate; and a plurality of heat dissipation fins overlapping with each other when viewed in a direction orthogonal to a surface of the substrate.

According to the present disclosure, there is provided a light source apparatus including: a solid state light source configured to emit excitation light having a first wavelength; a phosphor wheel including a disc-like substrate, a phosphor layer formed on the substrate and configured to be excited by the excitation light and emit light having a second wavelength different from the first wavelength and to transmit part of the excitation light, and a plurality of heat dissipation fins overlapping with each other when viewed in a direction orthogonal to a surface of the substrate; and a motor configured to rotationally drive the phosphor wheel in a plane parallel to the surface of the substrate.

According to the present disclosure, there is provided a projection-type display apparatus including: a light source apparatus; a light modulation and synthesis system configured to modulate and synthesize incident light; an illumination optical system configured to guide light emitted from the light source apparatus to the light modulation and synthesis system; and a projection optical system configured to project an image emitted from the light modulation and synthesis system. The light source apparatus includes a solid state light source configured to emit excitation light having a first wavelength, a phosphor wheel including a disc-like substrate, a phosphor layer formed on the substrate and configured to be excited by the excitation light and emit light having a second wavelength different from the first wavelength and to transmit part of the excitation light, and a plurality of heat dissipation fins overlapping with each other when viewed in a direction orthogonal to a surface of the substrate, and a motor configured to rotationally drive the phosphor wheel in a plane parallel to the surface of the substrate.

Advantageous Effects of Invention

As described above, according to the present disclosure, a phosphor wheel, a light source apparatus, and a projection-type display apparatus that can improve the efficiency of heat dissipation from the phosphor wheel while suppressing the air resistance and noise of the phosphor wheel can be obtained.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 22 is an illustration diagram showing an example of the arrangement of a ventilation duct and a phosphor wheel.

MODE(S) FOR CARRYING OUT THE INVENTION

Figure 1:
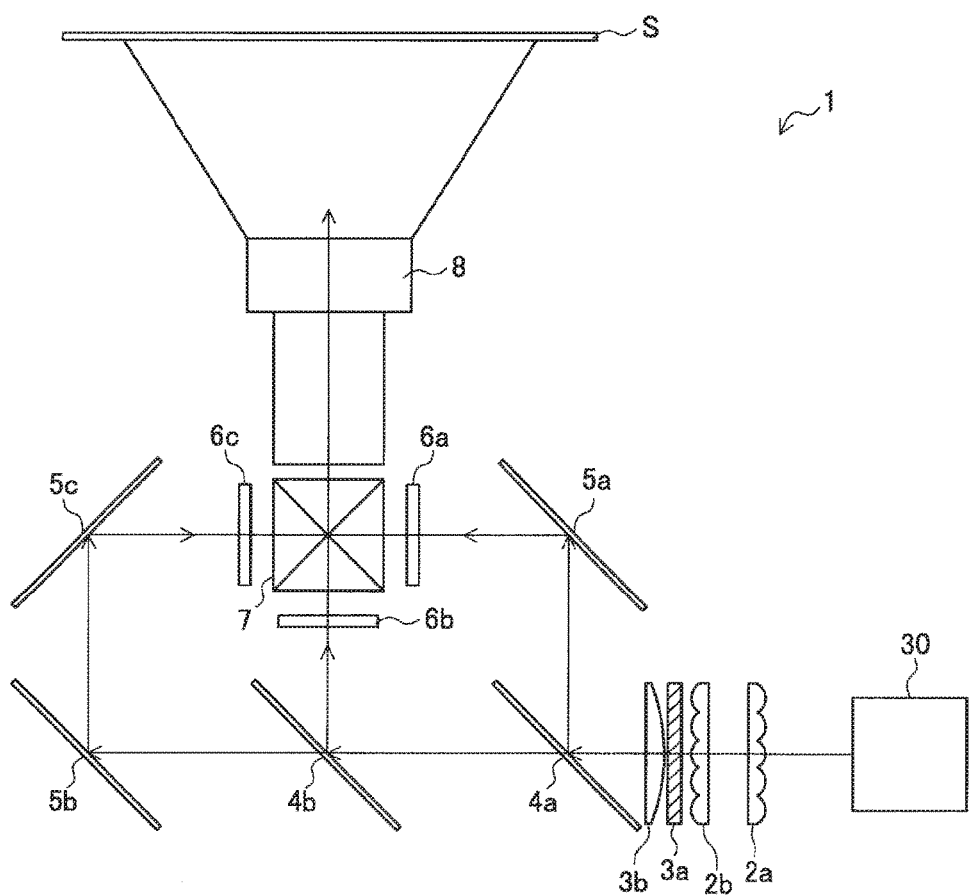
FIG. 1 is an illustration diagram showing an example of the configuration of a projection-type display apparatus according to a first embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description is given in the following order.
1. First embodiment (example in which heat dissipation structure unit is joined to substrate)
1.1. Example of configuration of projection-type display apparatus
1.2. Example of configuration of light source apparatus
1.3. Example of configuration of phosphor wheel
1.4. Example of configuration of supply path of cooling air
1.5. Modification Examples
2. Second embodiment (example in which heat dissipation fin serves also as substrate)
3. Third embodiment (example of being attached to motor via heat dissipation fin)
4. Fourth embodiment (example in which stress relaxation region is provided)
5. Fifth embodiment (example in which heat dissipation fin is provided on both surfaces of substrate)
5.1. Example of configuration of light source apparatus
5.2. Example of configuration of phosphor wheel
6. Sixth embodiment (example in which heat dissipation fin is formed of carbon fiber-mixed shaped product)
7. Seventh embodiment (example in which transmission-type substrate is joined to peripheral portion)

<1. First Embodiment>
[1.1. Example of Configuration of Projection-Type Display Apparatus]

First, an example of the configuration of a projection-type display apparatus 1 including a light source apparatus 10 according to a first embodiment of the present disclosure is described with reference to FIG. 1. FIG. 1 is a diagram showing a rough configuration of the projection-type display apparatus 1 including the light source apparatus 10 according to this embodiment.

The projection-type display apparatus 1 according to this embodiment is a projector that condenses the light emitted from a light source, emits light from a projection lens through a device that causes an image to be displayed, and projects an image on a display surface such as a screen S. The projection-type display apparatus 1 shown in FIG. 1 is an example of the configuration of a projector using a 3LCD as a micro-display.

The light emitted from the light source apparatus 10 passes through integrator lenses 2 composed of a first lens array 2a and a second lens array 2b so as to maintain the brightness up to the end portions of the display image, then passes through a polarization conversion element 3a and a condensing lens 3b, and is separated into wavelength ranges. The light that has passed through the condensing lens 3b is incident on a first reflecting dichroic mirror 4a that reflects only the light in the red wavelength range and allows the light in the other wavelength ranges to pass. Thus, the light in the red wavelength range is reflected by the first reflecting dichroic mirror 4a and travels toward a reflecting mirror 5a. The light in the red wavelength range is further reflected by the reflecting mirror 5a, and is incident on a liquid crystal panel for red color 6a.

The light in the other wavelength ranges that has passed through the first reflecting dichroic mirror 4a is incident on a second reflecting dichroic mirror 4b. The second reflecting dichroic mirror 4b reflects only the light in the green wavelength range, and allows the light in the other wavelength range, that is, the light in the blue wavelength range to pass. The light in the green wavelength range reflected by the second reflecting dichroic mirror 4b is incident on a liquid crystal panel for green color 6b. The light in the blue wavelength range that has passed through the second reflecting dichroic mirror 4b is reflected by reflecting mirrors 5b and 5c, and is then incident on a liquid crystal panel for blue color 6c.

Each of the liquid crystal panels for the above colors 6a to 6c modulates the light incident on itself in accordance with an input image signal, and thus generates signal light of an image corresponding to each of RGB. A transmission-type liquid crystal element using a high-temperature poly-silicon TFT, for example, may be used for the liquid crystal panels 6a to 6c. The signal light modulated by each of the liquid crystal panels 6a to 6c is incident on a dichroic prism 7 and is synthesized. The dichroic prism 7 is formed in a shape of a rectangular parallelepiped in which four triangular prisms are combined so as to reflect red signal light and blue signal light and transmit green signal light. The signal light of the colors synthesized by the dichroic prism 7 is incident on a projection lens 8, and is projected as an image on a display surface such as the screen S.

In the projection-type display apparatus 1, the liquid crystal panels 6a to 6c and the dichroic prism 7 function as a light modulation and synthesis system that modulates and synthesizes incident light. The integrator lenses 2, the polarization conversion element 3a, the condensing lens 3b, the reflecting dichroic mirrors 4a and 4b, and the reflecting mirrors 5a to 5c function as an illumination optical system that guides the light emitted from the light source apparatus 10 to the liquid crystal panels 6a to 6c included in the light modulation and synthesis system. The projection lens 8 functions as a projection optical system that projects an image emitted from the dichroic prism 7.

[1.2. Example of Configuration of Light Source Apparatus]

Figure 2:
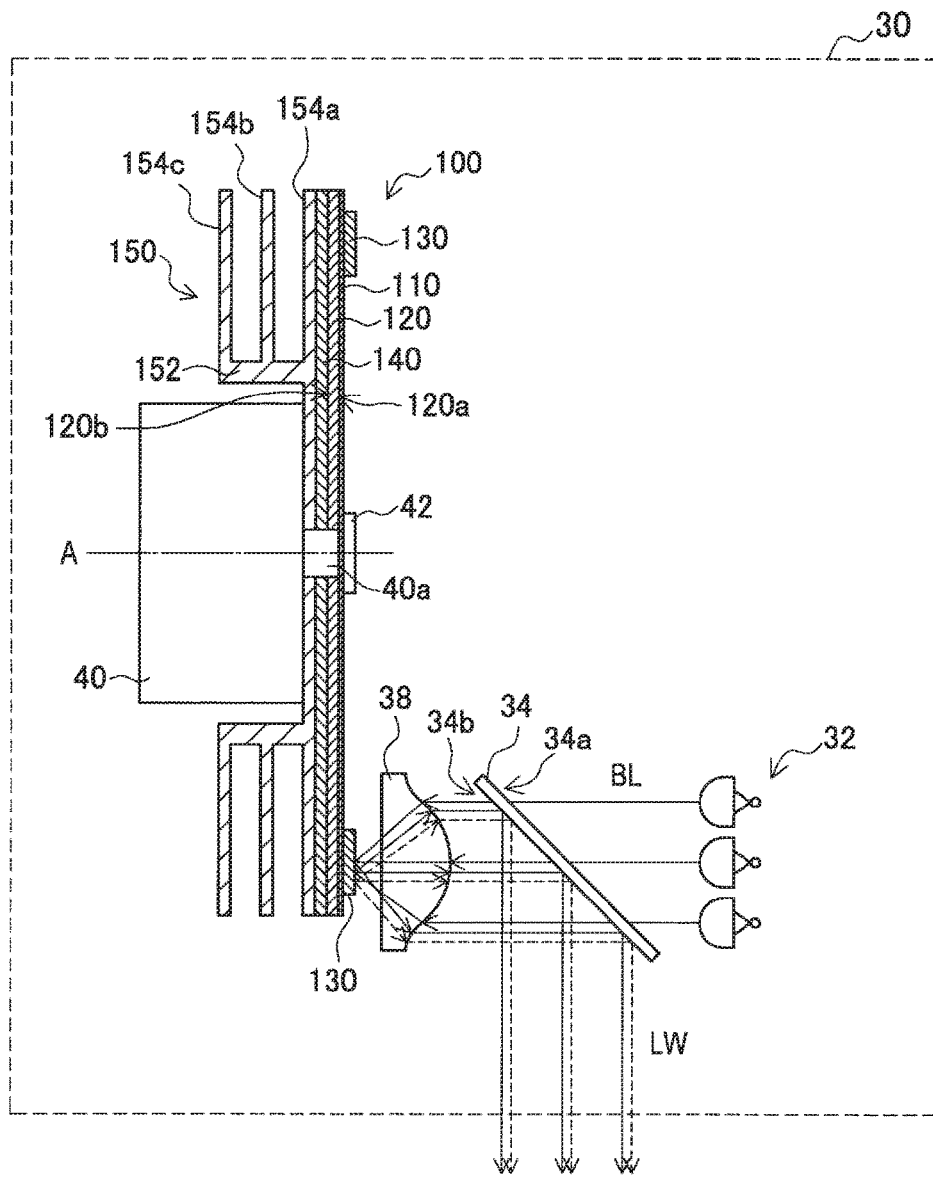
FIG. 2 is an illustration diagram showing an example of the configuration of a light source apparatus according to the embodiment.

Next, an example of the configuration of the light source apparatus 10 provided in the projection-type display apparatus 1 is described. FIG. 2 is a diagram showing an example of the rough configuration of the light source apparatus 10 according to this embodiment. The light source apparatus 10 is a light source apparatus that synthesizes laser light in the blue wavelength range and the light in the red wavelength range to the green wavelength range generated from a phosphor material excited by the laser light, that is, yellow light, and emits white light.

The light source apparatus 10 includes a solid state light source 32, a dichroic mirror 34, a condensing lens 38, a phosphor wheel 100, and a motor 40. The solid state light source 32 is an excitation light source for the irradiation (excitation) of a phosphor material, and is formed of a fixed light emitting element that emits light in a prescribed wavelength range (a first wavelength). The solid state light source 32 may be, for example, a blue laser that can oscillate blue laser light (excitation light) BL having a peak wavelength of light emission intensity in the wavelength range of 400 to 500 nm. The solid state light source 32 is placed on the extension of the optical path of the emitted light from the phosphor wheel 100.

In the case where the solid state light source 32 is formed of a blue laser, a prescribed power of excitation light BL may be obtained by one blue laser, or a prescribed power of excitation light BL may be obtained by combining the rays of emitted light from a plurality of blue lasers. In the example of FIG. 2, the rays of emitted light from three blue lasers are combined.

The dichroic mirror 34 is placed on the optical path between the solid state light source 32 and the condensing lens 38, with an inclination of approximately 45° with respect to the optical path. The excitation light BL emitted from the solid state light source 32 is incident on a first surface 34a of the dichroic mirror 34. The dichroic mirror 34 transmits the excitation light BL entering from the first surface 34a, and emits the light to the phosphor wheel 100 via the condensing lens 38. Further, the dichroic mirror 34 reflects, at a second surface 34b, the fluorescently emitted light emitted by a phosphor layer 130 that is placed facing the solid state light source 32 via the dichroic mirror 34 and the condensing lens 38 and the reflected light of the excitation light BL.

For example, the excitation light BL emitted from the solid state light source 32 is emitted as linearly polarized light, and the polarization of the fluorescently emitted light emitted from the phosphor layer 130 and the reflected light is rotated or disordered. Thereby, it becomes possible for the excitation light BL to be transmitted through the dichroic mirror 34 and yet for the fluorescently emitted light and the reflected light to be reflected. The configuration of the optical system that separates the excitation light BL incident from the solid state light source 32, and the fluorescently emitted light and the reflected light from the phosphor wheel 100 is not limited to the dichroic mirror 34, and an arbitrary optical system may be used.

The condensing lens 38 is placed on the optical path of the fluorescently emitted light and the reflected light from the phosphor wheel 100. The condensing lens 38 condenses the excitation light BL transmitted through the dichroic mirror 34 to a prescribed spot diameter, and emits the condensed light to the phosphor wheel 100. Further, the condensing lens 38 converts the fluorescently emitted light and the reflected light from the phosphor wheel 100 to parallel light, and emits the parallel light to the dichroic mirror 34. The condensing lens 38 may be formed of one collimator lens, or may have a configuration using a plurality of lenses, for example.

The phosphor wheel 100 absorbs part of the excitation light BL incident via the condensing lens 38 and emits light in a prescribed wavelength range (a second wavelength), and reflects the rest of the excitation light BL. The phosphor wheel 100 emits the fluorescently emitted light and the reflected excitation light to the condensing lens 38. In this embodiment, the light source apparatus 10 emits white light LW, and the phosphor wheel 100 emits light in a wavelength range including green light and red light (approximately 480 to 680 nm) due to the excitation light BL. The phosphor wheel 100 combines the fluorescently emitted light in two wavelength ranges including green light and red light and the excitation light reflected at the phosphor wheel 100 (blue light), and emits white light to the condensing lens 38. The configuration of the phosphor wheel 100 is described later in detail.

The motor 40 rotationally drives the phosphor wheel 100 at a prescribed rotation rate. In this event, in order for the phosphor wheel 100 to rotate in a plane (substrate plane) orthogonal to the direction of application of excitation light BL, the motor 40 rotationally drives the phosphor wheel 100 around a rotation axis A orthogonal to the substrate plane. Therefore, the irradiation position of excitation light BL in the phosphor layer 130 formed in the phosphor wheel 100 temporally changes at a speed corresponding to the rotation rate in a plane orthogonal to the direction of application of excitation light BL.

Thus, by rotationally driving the phosphor wheel 100 with the motor 40 and thereby temporally changing the irradiation position of excitation light BL in the phosphor wheel 100, the temperature increase of the irradiation position can be suppressed. Thereby, the reduction in the fluorescence conversion efficiency of the phosphor layer 130 can be suppressed. Here, it takes a little time for phosphor atoms to absorb excitation light BL and emit light; therefore, during the excitation period, even when the next ray of excitation light BL is applied to the phosphor atoms, light emission based on the next ray of excitation light BL does not occur. However, by temporally changing the irradiation position of excitation light BL in the phosphor wheel 100, not-excited phosphor atoms are successively placed into the irradiation position of excitation light BL. Thereby, the phosphor layer 130 can be caused to emit light more efficiently.

[1.3. Example of Configuration of Phosphor Wheel]

Figure 3:
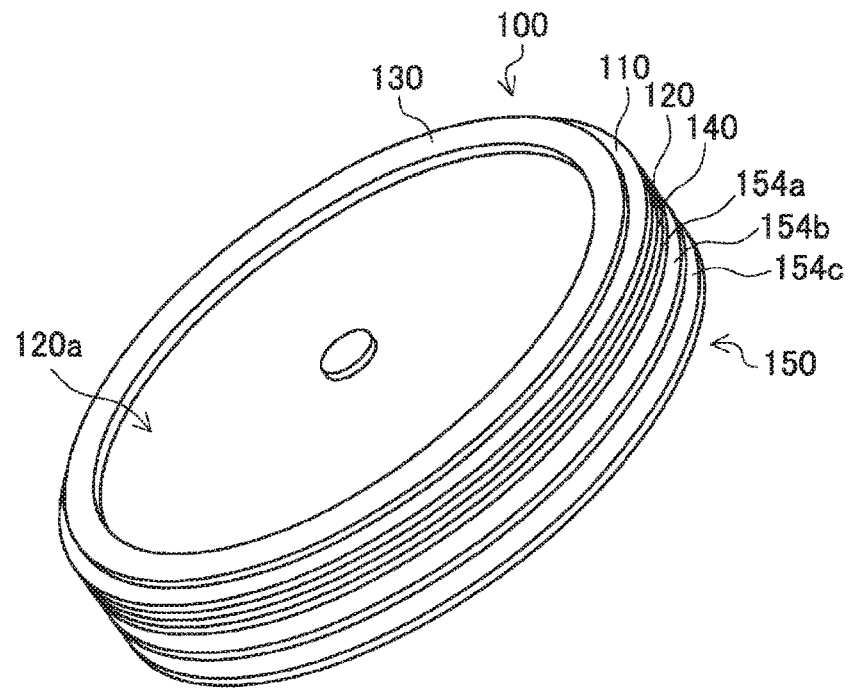
FIG. 3 is a perspective view of a phosphor wheel according to the embodiment.
Figure 4:
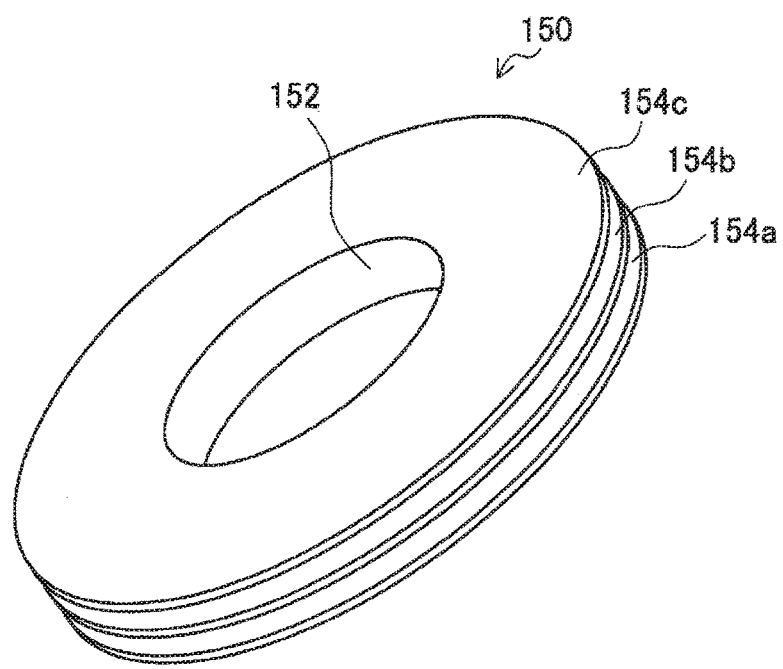
FIG. 4 is a perspective view of a heat dissipation structure body of the phosphor wheel according to the embodiment.

Next, an example of the configuration of the phosphor wheel 100 according to this embodiment is described. FIG. 2 shows a cross-sectional view of the phosphor wheel 100 taken along a plane including the rotation axis A. FIG. 3 is a perspective view of the phosphor wheel 100 as viewed from the side of a substrate 120, and FIG. 4 is a perspective view of a heat dissipation structure unit 150 included in the phosphor wheel 100 as viewed from the opposite side to the substrate 120 side. The phosphor wheel 100 includes a disc-like substrate 120, the phosphor layer 130 formed on one surface 120a of the substrate 120 (the incidence side of excitation light BL), a not-shown light reflecting film 110 provided between the substrate 120 and the phosphor layer 130, and a heat dissipation structure unit 150 including a plurality of heat dissipation fins 154a to 154c.

(1.3.1. Substrate)

The substrate 120 is formed using, for example, a non-light transmissive material such as a metal or an alloy of aluminum, molybdenum, or the like. The phosphor wheel 100 according to this embodiment is of a reflection type in which fluorescently emitted light and excitation light BL are reflected, and may be formed of any material having a prescribed strength regardless of whether it is a non-light transmissive material or a light transmissive material. However, since the phosphor wheel 100 according to this embodiment is of the reflection type, a substrate 120 made of a metal material is preferably used in order to improve the light reflectance. In particular, a substrate 120 made of a metal material such as aluminum or molybdenum can provide high thermal conductivity.

The substrate 120 is attached to, at its central portion, an output shaft 40a of the motor 40, and is fixed to the output shaft 40a by a fixing hub 42. The dimensions such as thickness of the substrate 120 are set in view of, for example, the needed strength, weight, processability, etc. as appropriate. In this embodiment, a substrate 120 made of molybdenum with a thickness of 0.5 mm and a diameter of 70 mm is used as an example. However, the diameter of the substrate 120 may be set in view of heat dissipation efficiency etc. because a phosphor wheel 100 with high heat dissipation efficiency can suppress the temperature increase of the phosphor layer 130 even when the diameter of the substrate 120 is small.

(1.3.2. Light Reflecting Film)

The light reflecting film 110 is provided at least between the substrate 120 and the phosphor layer 130 on the one surface 120a of the substrate 120. The light reflecting film 110 reflects all light regardless of the wavelength and incidence angle of incident light. Therefore, the light reflecting film 110 not only reflects the fluorescently emitted light excited in the phosphor layer 130 to the condensing lens 38 side, but also reflects part of the excitation light (blue light) BL transmitted through the phosphor layer 130 to the condensing lens 38 side. In the phosphor wheel 100 according to this embodiment, a light reflecting film 110 formed of, for example, a metal film of aluminum or the like or a light reflective resin film is provided on a substrate 120 made of molybdenum.

The light reflecting film 110 may, on the one surface 120a of the substrate 120, be formed in a circular shape having an opening at its center so as to correspond to at least the position of placement of the phosphor layer 130. In this case, the light reflecting film 110 is placed on the substrate 120 so as to form a circle concentric with the substrate 120. The width in the diameter direction of the light reflecting film 110 is set larger than at least the spot size of the excitation light (condensed light) BL condensed by the condensing lens 38. However, in the case where the substrate 120 is formed of a metal or an alloy of aluminum or the like, the surface 120a on which the phosphor layer 130 is formed may be provided with a function as a light reflecting film by being mirror-finished.

(1.3.3. Phosphor Layer)

The phosphor layer 130 is formed of a layer-form phosphor; and upon the incidence of excitation light BL, absorbs part of the excitation light BL and emits light in a prescribed wavelength range (the second wavelength). Further, the phosphor layer 130 transmits part of the not-absorbed remaining excitation light BL, and diffuses (reflects) the rest of the excitation light BL. The phosphor layer 130 may be formed by applying a fluorescent agent in which a fluorescent material and a binder are mixed onto the light reflecting film 110. The phosphor layer 130 may be formed using water glass ($Na_2SiO_3$). The phosphor layer 130 may be applied over the entire surface of the substrate 120, or may be applied only to a peripheral portion that is to be irradiated with excitation light.

In this embodiment, the phosphor layer 130 is formed of, for example, an yttrium aluminum garnet (YAG)-based fluorescent material or the like. Thus, white light can be generated by combining part of the excitation light BL reflected at the light reflecting film 110 and the phosphor layer 130 and the fluorescently emitted light emitted by the phosphor layer 130. In the case where the phosphor layer 130 is formed of YAG, when blue excitation light BL is incident, the phosphor layer 130 emits light in the wavelength range of 480 to 680 nm. The light in this wavelength range includes red light and blue light, and these rays of light are combined and emitted as yellow light.

The proportion of the amount of light emission, the amount of transmitted excitation light, and the amount of reflected excitation light in the phosphor layer 130 can be adjusted by, for example, the thickness, phosphor density, etc. of the phosphor layer 130. That is, in this embodiment, the thickness, phosphor density, etc. of the phosphor layer 130 are adjusted so that the light emitted from the light source apparatus 10 is white light. In this embodiment, the thickness of the phosphor layer 130 is 0.5 mm.

The phosphor layer 130 generates heat when it is excited by excitation light BL and emits light; however, the thermal conductivity of the phosphor layer 130 is relatively small, and therefore heat is transferred mainly to the substrate 120 side. Thus, the phosphor wheel 100 according to this embodiment has a configuration in which the heat of the phosphor layer 130 is transferred to the heat dissipation structure unit 150 via the substrate 120 and a joining layer 140 and is dissipated.

(1.3.4. Joining Layer)

The joining layer 140 is made of a thermally conductive adhesive or a thermally conductive adhesive sheet, and has the function of joining the heat dissipation structure unit 150 to the substrate 120, on a surface 120b on the opposite side to the surface 120a on which the phosphor layer 130 is formed. By the joining layer 140 having thermal conductivity, the heat that the substrate 120 has can be efficiently transferred to the heat dissipation structure unit 150. In this embodiment, it is preferable that the substrate 120 be made of molybdenum, the heat dissipation structure unit 150 be made of aluminum, and the joining layer 140 have elasticity in view of the fact that the thermal expansion coefficients of both the above components are different.

However, in the case where, for example, both the substrate 120 and the heat dissipation structure unit 150 are formed of aluminum and the thermal expansion coefficients of the substrate 120 and the heat dissipation structure unit 150 substantially coincide, the usable material is not limited as long as a joining layer 140 having thermal conductivity can be obtained.

If the thickness of the joining layer 140 is small, the heat dissipation structure unit 150 is likely to peel off from the substrate 120; on the other hand, if the thickness of the joining layer 140 is large, the thermal conductivity may be reduced. Hence, the thickness of the joining layer 140 is preferably set to a value in the range of 0.1 to 0.5 mm, and more preferably set to a value in the range of 0.2 to 0.4 mm.

In this embodiment, a silicon-based adhesive having thermal conductivity is used, and the thickness of the joining layer 140 is 0.3 mm.

(1.3.5. Heat Dissipation Structure Unit)

The heat dissipation structure unit 150 is joined to the surface 120b of the substrate 120 on the opposite side to the surface 120a on which the phosphor layer 130 is formed, and has the function of dissipating heat from the phosphor wheel 100. The phosphor wheel 100 according to this embodiment is of the reflection type, and the heat dissipation structure unit 150 is joined to the entire surface 120b of the substrate 120.

The heat dissipation structure unit 150 of the phosphor wheel 100 according to this embodiment includes a plurality of heat dissipation fins 154a, 154b, and 154c that overlap with each other when viewed in a direction orthogonal to the surface 120a of the substrate 120. The heat dissipation structure unit 150 includes three heat dissipation fins 154a, 154b, and 154c, but the number of heat dissipation fins is not limited to this. However, if the weight of the heat dissipation structure unit 150 is increased, the power consumption of the motor 40 is increased; hence, the number of heat dissipation fins is set in view of heat dissipation efficiency and the total weight.

Each of the plurality of heat dissipation fins 154a to 154c has a disc-like external shape, and is provided in a shape of a circle concentric with the substrate 120. Further, the plurality of heat dissipation fins 154a to 154c are provided parallel to each other and parallel to the substrate 120. The one heat dissipation fin 154a of the plurality of heat dissipation fins 154a to 154c has a rising section 152 extending in a direction orthogonal to the surface 120b of the substrate 120. The other heat dissipation fins 154b and 154c are formed to extend from the rising section 152. The gaps formed between the plurality of heat dissipation fins 154a to 154c are each opened in the direction toward the outer periphery of the phosphor wheel 100.

The rising section 152 has a circular cylindrical shape, and the motor 40 is placed in the interior of the rising section 152. The rising section 152 is not limited to a shape extending in a direction orthogonal to the surface 120b of the substrate 120. Also a rising section in a tapered shape in which the diameter increases or decreases with distance from the surface 120b is possible.

The shape of, among the plurality of heat dissipation fins 154a to 154c, the heat dissipation fin 154a adhered to the substrate 120 substantially coincides with the shape of the substrate 120, and the heat dissipation fin 154a is joined to the entire area of the surface 120b of the substrate 120 by the joining layer 140. The rising section 152 is raised from a central portion in the radius direction of the heat dissipation fin 154a. The other heat dissipation fins 154b and 154c are placed on the outside in the diameter direction with respect to the rising section 152, and are connected to the rising section 152 at their inner edge portions. Also the outer edges of the heat dissipation fins 154b and 154c substantially coincide with the outer edge of the substrate 120.

The heat dissipation structure unit 150 according to this embodiment may be shaped using aluminum or copper, which is light in weight, shapable at low cost, and high in thermal conductivity. The heat dissipation structure unit 150 according to this embodiment is formed of a processed product obtained by integrally shaping the plurality of heat dissipation fins 154a to 154c and the rising section 152 by cutting. Therefore, there is no reduction in heat transfer efficiency in the connecting portion, and there is no possibility of damage from the connecting portion, either. However, the heat dissipation structure unit 150 may be formed also by joining a plurality of heat dissipation fins and a rising section obtained by processing a metal sheet such as an aluminum sheet.

The thickness of the heat dissipation structure unit 150 is set in view of shapability, strength, etc. In this embodiment, the heat dissipation structure unit 150 is shaped by cutting, and the thickness of the plurality of heat dissipation fins 154a to 154c and the rising section 152 is 0.5 mm. The diameter of the plurality of heat dissipation fins 154a to 154c and the size of the gaps between the heat dissipation fins 154a to 154c are set in view of weight, heat dissipation efficiency, etc. However, the heat dissipation structure unit 150 is preferably joined to at least the rear surface side of the phosphor layer 130 formed on the surface 120a of the substrate 120. Thereby, the heat that the phosphor layer 130 has can be efficiently transferred to the heat dissipation structure unit 150, and can be dissipated.

The surface area of the heat dissipation structure unit 150 can be increased by thus using the heat dissipation structure unit 150 including the plurality of heat dissipation fins 154a to 154c. Heat can be efficiently dissipated from the substrate 120 by joining the heat dissipation structure unit 150 to the substrate 120 via the thermally conductive joining layer 140. Therefore, the temperature increase of the phosphor layer 130 can be prevented. As a result, the fluorescence conversion efficiency of the phosphor layer 130 can be kept high, and the wavelength of fluorescently emitted light (the second wavelength) can be stabilized.

Furthermore, since the substrate 120 and the heat dissipation structure unit 150 are separate bodies, a phosphor wheel 100 with improved heat dissipation efficiency can be obtained by joining the heat dissipation structure unit 150 to an existing phosphor wheel substrate. That is, the phosphor wheel 100 can be obtained without altering the existing process of forming the light reflecting film 110 on the disc-like substrate 120 and applying a fluorescent material to form the phosphor layer 130.

Furthermore, since the plurality of heat dissipation fins 154a to 154c are provided parallel to the substrate 120, the heat dissipation fins 154a to 154c encounter limited air resistance when the phosphor wheel 100 rotates. Therefore, the noise due to the rotation of the phosphor wheel 100 can be suppressed, and the increase in the power consumption of the motor 40 can be suppressed. However, the configuration to reduce the air resistance encountered by the heat dissipation fins 154a to 154c is not limited to the example in which the heat dissipation fins 154a to 154c are arranged parallel to the substrate 120. For example, the heat dissipation fins 154a to 154c may be provided such that, when an arbitrary cross section including the rotation axis A is viewed, the angle between each of the heat dissipation fins 154a to 154c and the substrate 120 is fixed, and thereby the air resistance encountered by the heat dissipation fins 154a to 154c can be reduced.

[1.4. Example of Configuration of Supply Path of Cooling Air]

In the phosphor wheel 100 according to this embodiment, the gaps formed between the plurality of heat dissipation fins 154a to 154c is opened in the direction toward the outer periphery of the phosphor wheel 100. Thus, cooling air may be introduced into the gaps between the plurality of heat dissipation fins 154a to 154c in order to improve the heat dissipation efficiency.

Figure 5:
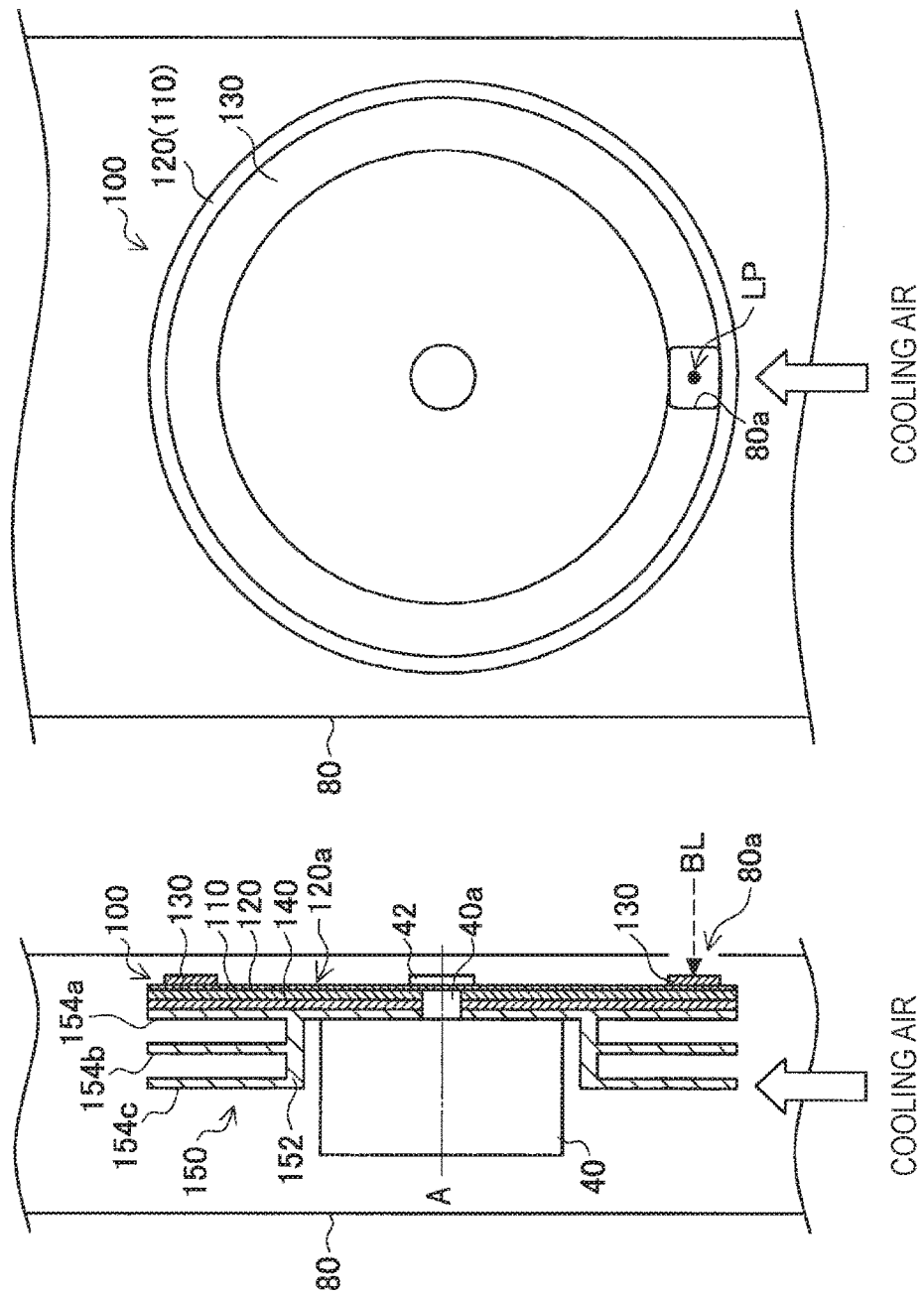
FIG. 5 is an illustration diagram showing an example of the arrangement of a ventilation duct and a phosphor wheel.

FIG. 5 shows a situation in which the phosphor wheel 100 is placed in a ventilation duct 80. The phosphor wheel 100 is placed in the ventilation duct 80 in such a manner that the surface 120a of the substrate 120 runs along the direction of installation of the ventilation duct 80. In this event, the irradiation position of excitation light BL of the phosphor layer 130 is located on the upstream side of the flowing of cooling air (the lower side of FIG. 5). An opening 80a is provided in the ventilation duct 80 to correspond to the irradiation position, and a not-shown condensing lens etc. are arranged to correspond to the opening 80a.

By thus placing the phosphor wheel 100 in the ventilation duct 80, the cooling air delivered by a cooling fan or the like can be supplied to the gaps between the plurality of heat dissipation fins 154a to 154c in an area corresponding to the irradiation position of excitation light BL. Thereby, cooling air is supplied to the heat dissipation fins 154a to 154c in an area in the phosphor layer 130 corresponding to the irradiation position, where heat generation is likely to occur. Therefore, the heat generated by the phosphor layer 130 can be efficiently dissipated, and the temperature increase of the phosphor layer 130 can be suppressed.

[1.5. Modification Examples]

Next, Modification Examples of the phosphor wheel 100 according to this embodiment are described.

(1.5.1. Modification Example 1)

Figure 6:
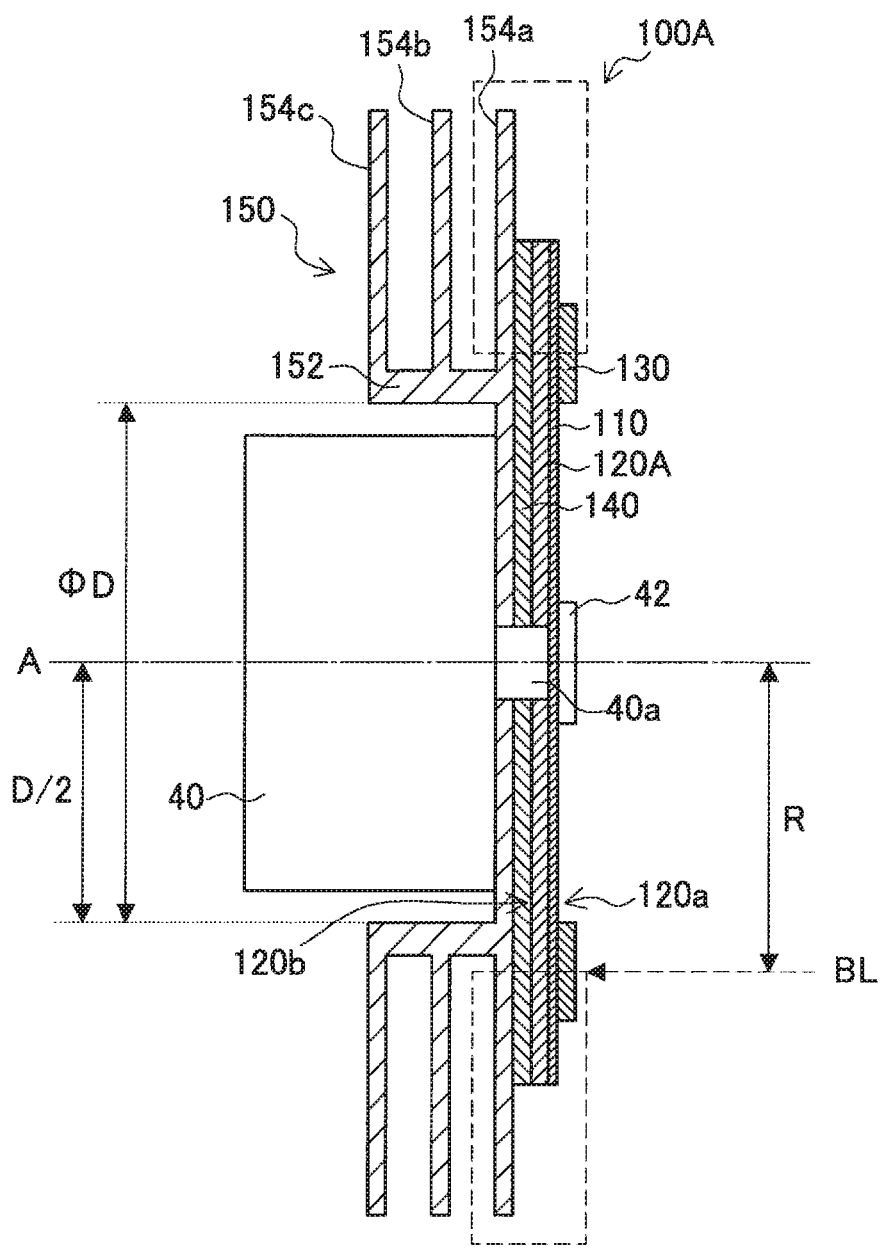
FIG. 6 is a cross-sectional view of a phosphor wheel of Modification Example 1 of the embodiment.

FIG. 6 shows Modification Example 1 of this embodiment. FIG. 6 shows a cross-sectional view of a phosphor wheel 100A according to Modification Example 1 taken along a plane including the rotation axis A. In the phosphor wheel 100A, the rising position of the rising section 152 of the heat dissipation structure unit 150 joined to the surface 120b of the substrate 120 corresponds to the position of formation of the phosphor layer 130. In the phosphor wheel 100A, the irradiation position of excitation light BL is set to a position satisfying the following relation.

$$D/2 < R$$

R: the distance from the center of the substrate (the rotation axis A) to the irradiation position D: the diameter of the rising portion of the rising section The irradiation position of excitation light BL may be set to a position satisfying the above condition of $D/2 < R$ and further satisfying the following relation.

$$0.4 \leq S/S_A \leq 0.6$$

$S_A$: the entire surface area of the area in contact with air in the surface of the phosphor wheel S: the surface area of the area that is in the substrate on which the phosphor layer is formed and the heat dissipation fin joined to the substrate and that is on the outer periphery side with respect to the irradiation position of excitation light (the area enclosed by the broken line of FIG. 6)

By placing the irradiation position of excitation light BL in the range defined as above, the heat of the phosphor layer 130 can be transferred equally from each of the outer periphery side and the inner periphery side with respect to the phosphor layer 130 to the heat dissipation structure unit 150, and can be efficiently dissipated. Furthermore, in the Modification Example 1, the substrate 120 on the outer periphery side with respect to the position where the phosphor layer 130 is applied may be omitted. That is, the diameter of a substrate 120A of the phosphor wheel 100A according to Modification Example 1 can be made smaller than the diameter of the substrate 120 of the phosphor wheel 100 shown in FIG. 2. Thereby, the weight of the phosphor wheel 100A can be reduced, and the power consumption of the motor 40 can be suppressed.

(1.5.2. Modification Example 2)

Figure 7:
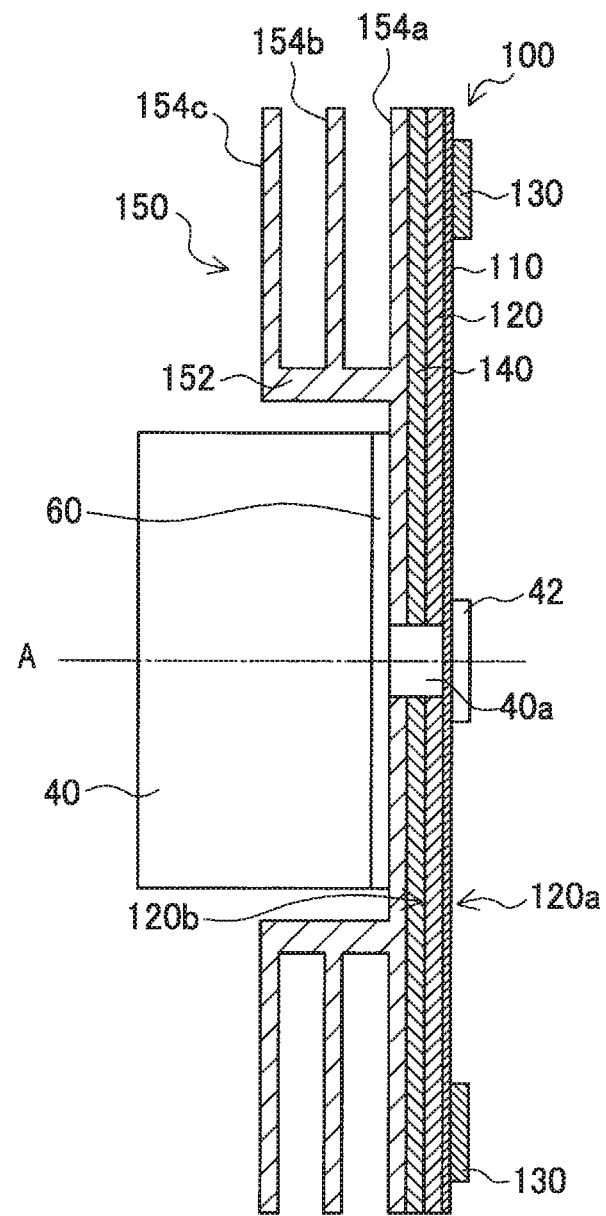
FIG. 7 is a cross-sectional view of a phosphor wheel of Modification Example 2 of the embodiment.

FIG. 7 shows Modification Example 2 of this embodiment. FIG. 7 shows a cross-sectional view of the phosphor wheel 100 connected to the motor 40 taken along a plane including the rotation axis A. In the Modification Example 2, the phosphor wheel 100 is connected to the motor 40 via a heat insulating member 50. The heat insulating member 50 may be, for example, a member with a thermal conductivity of 10 W/mk or less. Further, the heat insulating member 50 may have heat resistance in view of the durability of the heat insulating member 50 itself. A polycarbonate or the like may be used as the material of the heat insulating member 50, but the material is not limited to this.

By connecting the phosphor wheel 100 to the motor 40 via the heat insulating member 50, the heat transfer from the phosphor wheel 100 to the motor 40 can be suppressed. Therefore, even when the amount of heat generation in the phosphor layer 130 is large, the temperature increase of the motor 40 is suppressed, and the motor 40 can be prevented from having a short lifetime.

(1.5.3. Modification Example 3)

Figure 8:
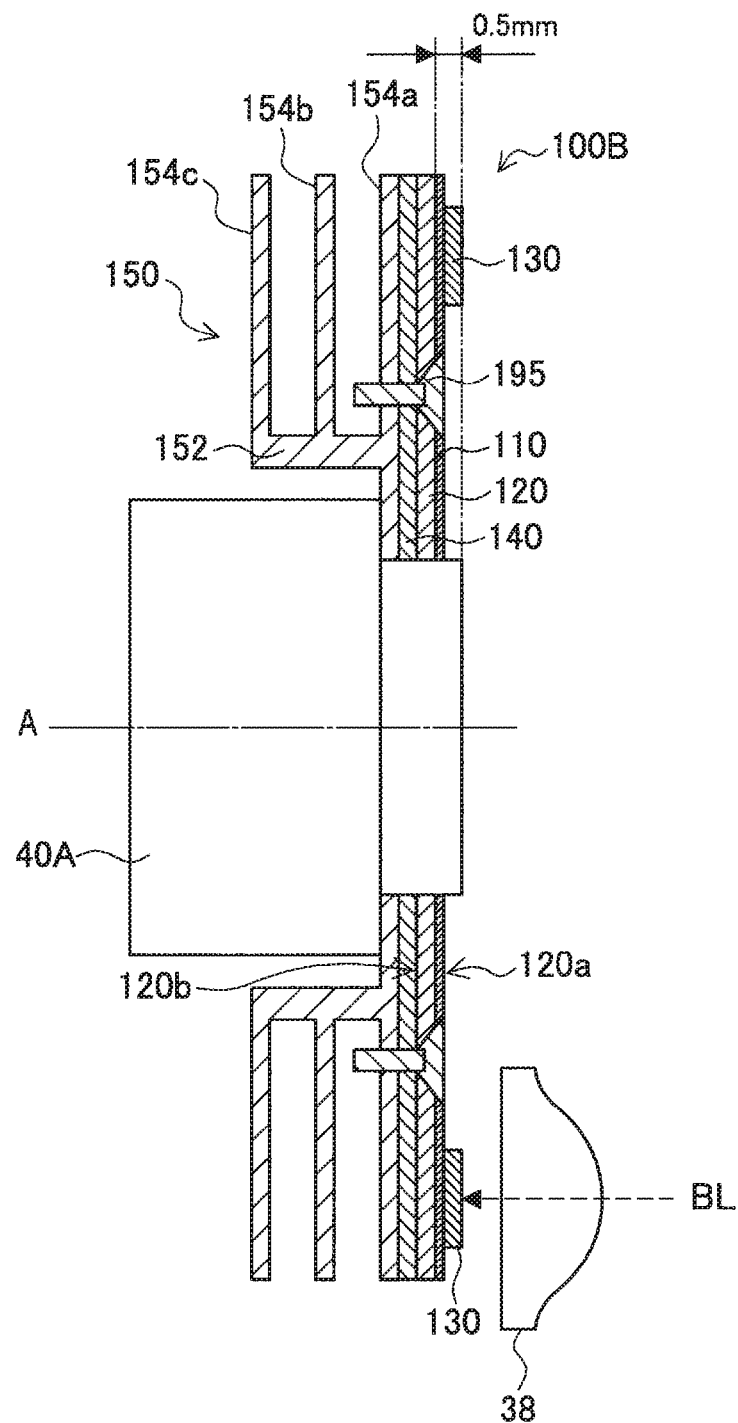
FIG. 8 is a cross-sectional view of a phosphor wheel of Modification Example 3 of the embodiment.

FIG. 8 shows Modification Example 3 of this embodiment. FIG. 8 shows a cross-sectional view of a phosphor wheel 100B according to Modification Example 3 taken along a plane including the rotation axis A. In the phosphor wheel 100B according to the Modification Example 3, the fixation between the substrate 120 and the heat dissipation structure body 150 is made firm by a fixing screw 195. In the case where a member protruding from the surface 120a of the substrate 120 on which the phosphor layer 130 is formed is present on the surface 120a in a state where the phosphor wheel 100B is attached to the motor 40, the height from the surface 120a (the amount of protrusion) is set to 0.5 mm or less.

In Modification Example 3, the thickness of the phosphor layer 130 is set to 0.5 mm or less, and also the amount of protrusion of the output shaft 40a of the motor 40 is 0.5 mm. Also for the screw head of the fixing screw 195, the fixing screw 195 has entered the substrate 120 so as not to protrude from the surface 120a of the substrate 120 on which the light reflecting film 110 is formed. Therefore, even in the case where the condensing lens 38 etc. are placed close to the phosphor wheel 100, there is no case where part of the motor 40 or part of the phosphor wheel 100 comes into contact with the condensing lens 38, and the damage to the light source apparatus 10 can be prevented.

Figure 9:
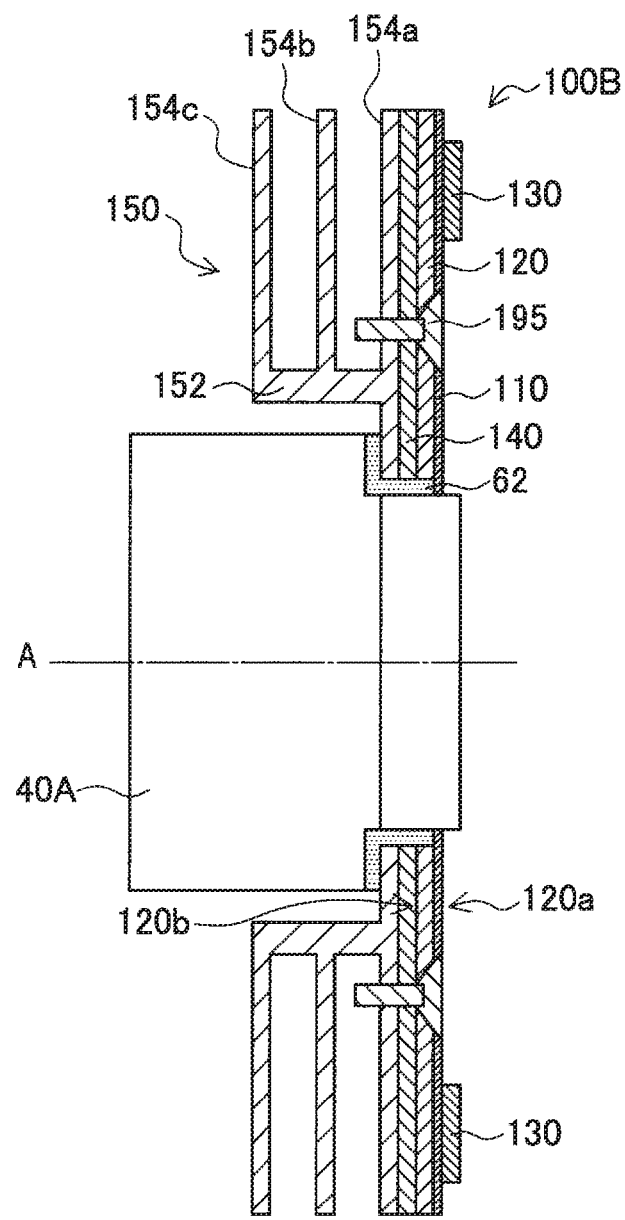
FIG. 9 is a cross-sectional view showing a phosphor wheel of Modification Example 4 attached to a motor via a heat insulating member.

FIG. 9 shows a situation in which the phosphor wheel 100B according to Modification Example 3 is attached to the motor 40 via a heat insulating member 52. Also the heat insulating member 52 may have heat resistance similarly to the heat insulating member 50 according to Modification Example 2. By connecting the phosphor wheel 100B to the motor 40 via the heat insulating member 52, even when the amount of heat generation in the phosphor layer 130 is large, the temperature increase of the motor 40 is suppressed, and the motor 40 can be prevented from having a short lifetime.

Thus, in the phosphor wheels 100, 100A, and 100B according to the first embodiment of the present disclosure, the heat dissipation structure unit 150 is joined to the surface 120b on the opposite side to the surface 120a on which the phosphor layer 130 to be irradiated with excitation light BL is formed. The heat dissipation structure unit 150 includes the plurality of heat dissipation fins 154a to 154c that overlap with each other when viewed in a direction orthogonal to the surface 120b of the substrate 120. Therefore, the surface area of the phosphor wheels 100, 100A, and 100B is increased, and the heat dissipation efficiency can be improved. Thus, the fluorescence conversion efficiency of the phosphor layer 130 is enhanced, and also the maximum luminance of emitted light is enhanced.

Furthermore, the heat dissipation fins 154a to 154c encounter limited air resistance during the rotation of the phosphor wheels 100, 100A, and 100B. Therefore, the noise due to the rotation of the phosphor wheels 100, 100A, and 100B can be suppressed, and also the power consumption of the motor 40 can be suppressed. Furthermore, the phosphor wheel 100 with high heat dissipation efficiency can suppress the power consumption of the motor 40 also in terms of the rotation rate of the motor 40 being allowed to be reduced. Thus, it becomes possible to downsize the motor 40.

<2. Second Embodiment>

Next, a phosphor wheel according to a second embodiment of the present disclosure is described. The phosphor wheel according to this embodiment is a reflection-type phosphor wheel similarly to the phosphor wheel according to the first embodiment. The phosphor wheel according to this embodiment may be configured similarly to the phosphor wheel according to the first embodiment except that one of the heat dissipation fins has a function as a substrate.

Figure 10:
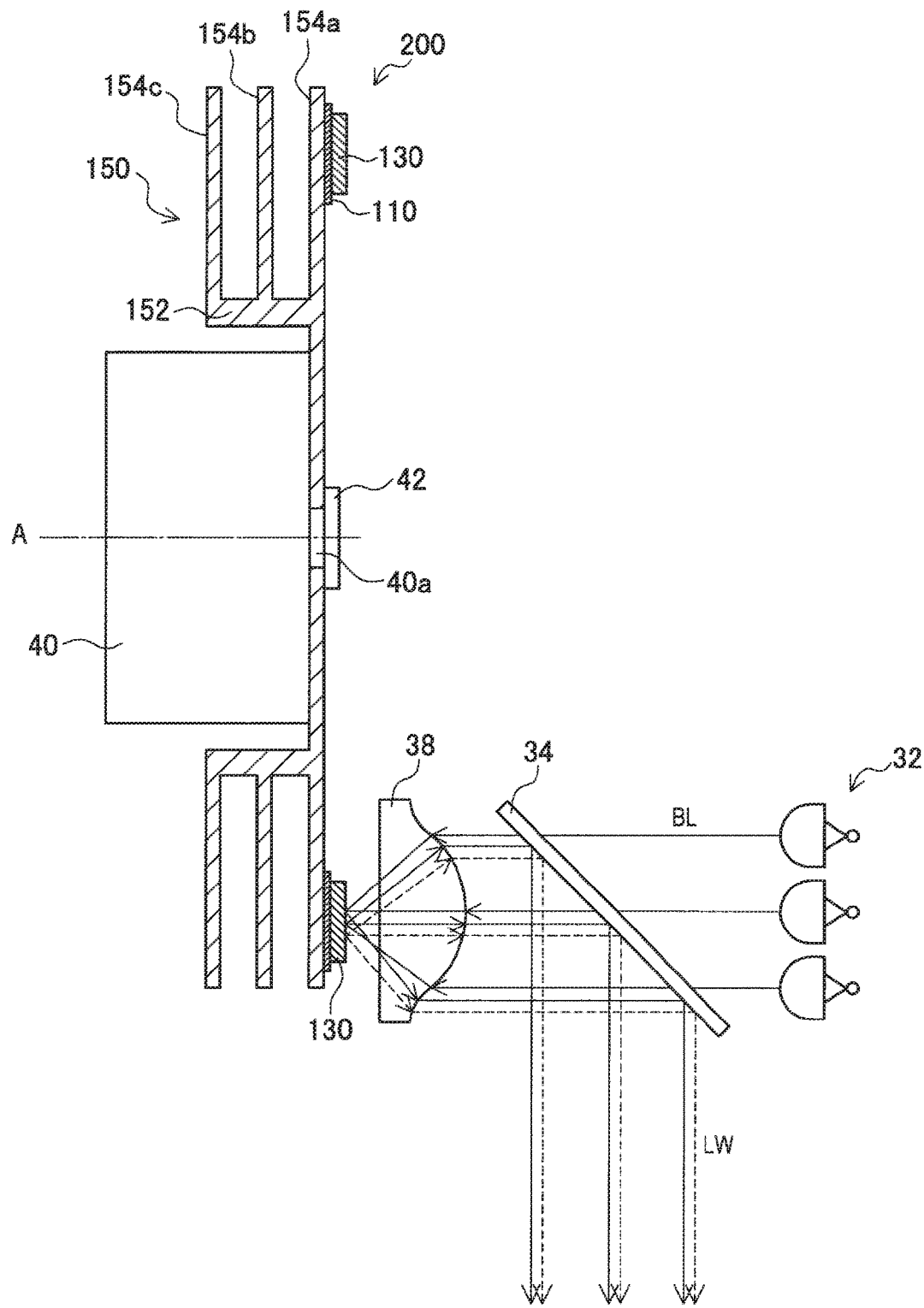
FIG. 10 is an illustration diagram showing an example of the configuration of a light source apparatus according to a second embodiment of the present disclosure.

FIG. 10 shows a phosphor wheel 200 according to this embodiment. FIG. 10 shows a cross-sectional view of the phosphor wheel 200 taken along a plane including the rotation axis A. In the phosphor wheel 200, the heat dissipation fin 154a of the heat dissipation structure body 150 has a function as a substrate on which the phosphor layer 130 is formed. In the phosphor wheel 200, the light reflecting film 110 is formed on the heat dissipation fin 154a included in the heat dissipation structure unit 150, and the phosphor layer 130 is formed by applying a fluorescent material.

The heat dissipation structure unit 150 is formed of, for example, a metal or an alloy of aluminum, copper, or the like with a high thermal conductivity, and the light reflecting film 110 is formed at least on the surface of the area where the phosphor layer 130 is formed. The surface of the heat dissipation fin 154a of the heat dissipation structure unit 150 may be provided with a function as a light reflecting film by being mirror-finished. The fluorescently emitted light emitted due to the excitation light BL applied to the phosphor layer 130 and part of the excitation light BL are reflected at the light reflecting film 110 on the heat dissipation structure unit 150.

The heat dissipation fin 154a of the heat dissipation structure unit 150 functions as a substrate, and the light reflecting film 110 and the phosphor layer 130 are formed on the heat dissipation fin 154a; thereby, the amount of heat generated in the phosphor layer 130 is transferred to the heat dissipation structure unit 150 more efficiently. Therefore, the temperature increase of the phosphor layer 130 can be effectively suppressed. Furthermore, by the heat dissipation fin 154a having a function as a substrate, the weight of the phosphor wheel 200 is reduced, and the power consumption of the motor 40 can be reduced.

Figure 11:
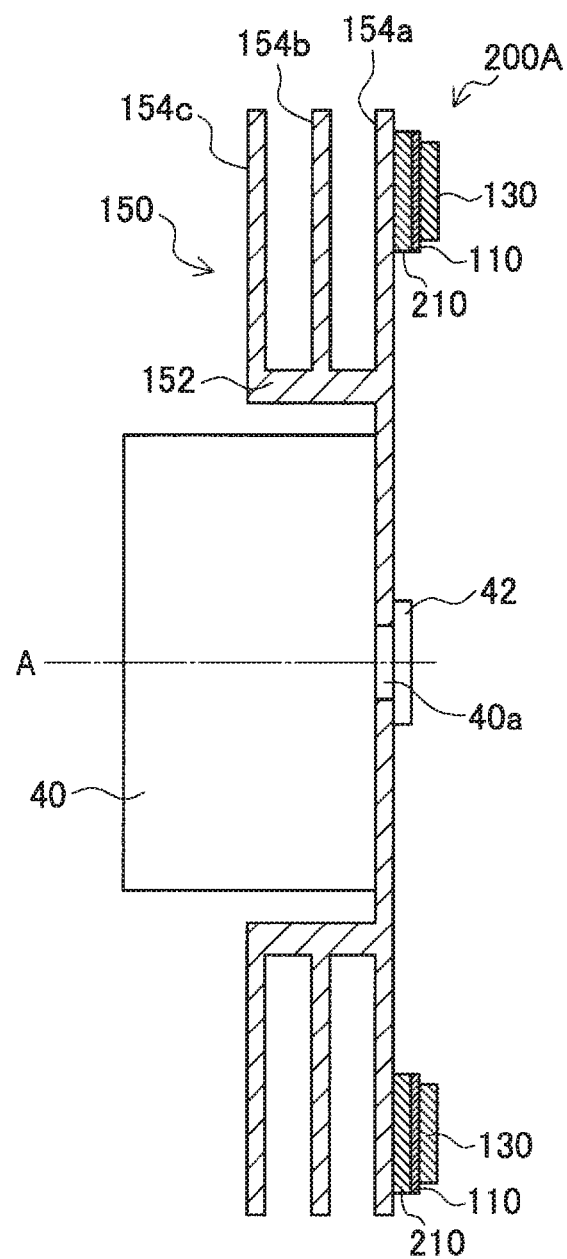
FIG. 11 is a cross-sectional view showing an example of the configuration of a phosphor wheel according to the embodiment.

FIG. 11 shows another example of the configuration of the phosphor wheel according to this embodiment. In such a phosphor wheel 200A, a base unit 210 made of aluminum, which is the same material as the heat dissipation structure unit 150, is provided on the surface of the heat dissipation fin 154a, and the phosphor layer 130 is formed on the base unit 210. In such an example of the configuration, the light reflecting film 110 is formed between the base unit 210 and the phosphor layer 130. Thus, the surface on which the phosphor layer 130 is formed protrudes from the surface of the heat dissipation fin 154a; thereby, even in the case where another member protrudes from the surface of the heat dissipation fin 154a, it is easy for the condensing lens to be brought close to the phosphor layer 130.

Figure 12:
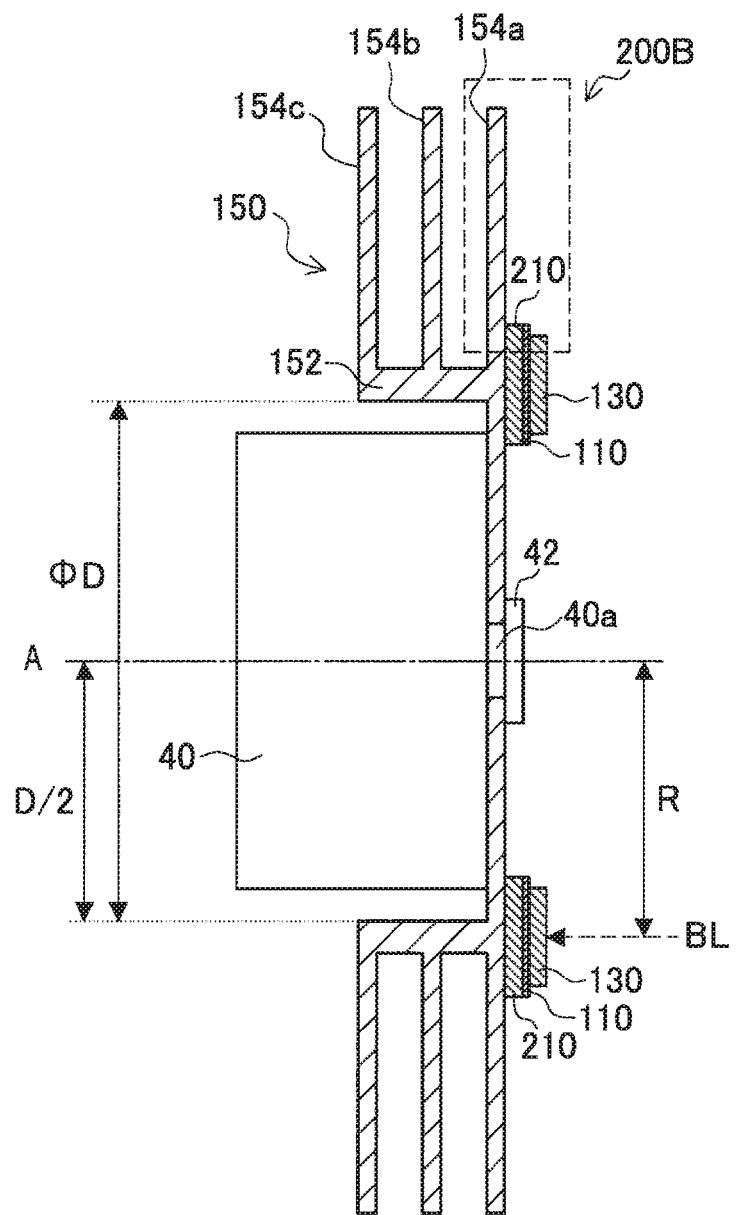
FIG. 12 is a cross-sectional view showing another example of the configuration of the phosphor wheel according to the embodiment.

FIG. 12 shows still another example of the configuration of the phosphor wheel according to this embodiment. In such a phosphor wheel 200B, like in Modification Example 1 of the first embodiment, the irradiation position of excitation light BL is set to a position satisfying the following relation.

$$D/2 < R$$

R: the distance from the rotation center of the heat dissipation structure unit (the rotation axis A) to the irradiation position D: the diameter of the rising portion of the rising section Like in Modification Example 1 of the first embodiment, the irradiation position of excitation light BL may be set to a position further satisfying the following relation.

$$0.4 \leq S/S_A \leq 0.6$$

$S_A$: the entire surface area of the area in contact with air in the surface of the phosphor wheel S: the surface area of the area that is in the heat dissipation fin on which the phosphor layer is formed and that is on the outer periphery side with respect to the irradiation position of excitation light (the area enclosed by the broken line of FIG. 12)

In the phosphor wheel 200B, by placing the irradiation position of excitation light BL in the range defined as above, the heat of the phosphor layer 130 can be transferred equally from each of the outer periphery side and the inner periphery side with respect to the phosphor layer 130 to the heat dissipation structure unit 150, and can be efficiently dissipated.

Thus, the phosphor wheels 200 and 200A according to the second embodiment of the present disclosure can obtain similar effects to the phosphor wheel according to the first embodiment. Furthermore, in the phosphor wheels 200 and 200A according to this embodiment, since the heat dissipation fin 154a, which is part of the heat dissipation structure unit 150, serves also as a substrate, the weight is reduced more, and phosphor wheels 200 and 200A with higher heat dissipation efficiency can be obtained.

<3. Third Embodiment>

Next, a phosphor wheel according to a third embodiment of the present disclosure is described. The phosphor wheel according to this embodiment is a reflection-type phosphor wheel similarly to the phosphor wheels according to the first and second embodiments. Also a light source apparatus according to this embodiment may be one used for the projection-type display apparatus illustrated in the first embodiment. Also the basic configuration of the light source apparatus may be a similar configuration to the light source apparatus described in the first embodiment. Hence, herein, a description of the basic configuration of the projection-type display apparatus and the light source apparatus is omitted, and a description is given with a focus on the configuration of the phosphor wheel according to this embodiment.

Figure 13:
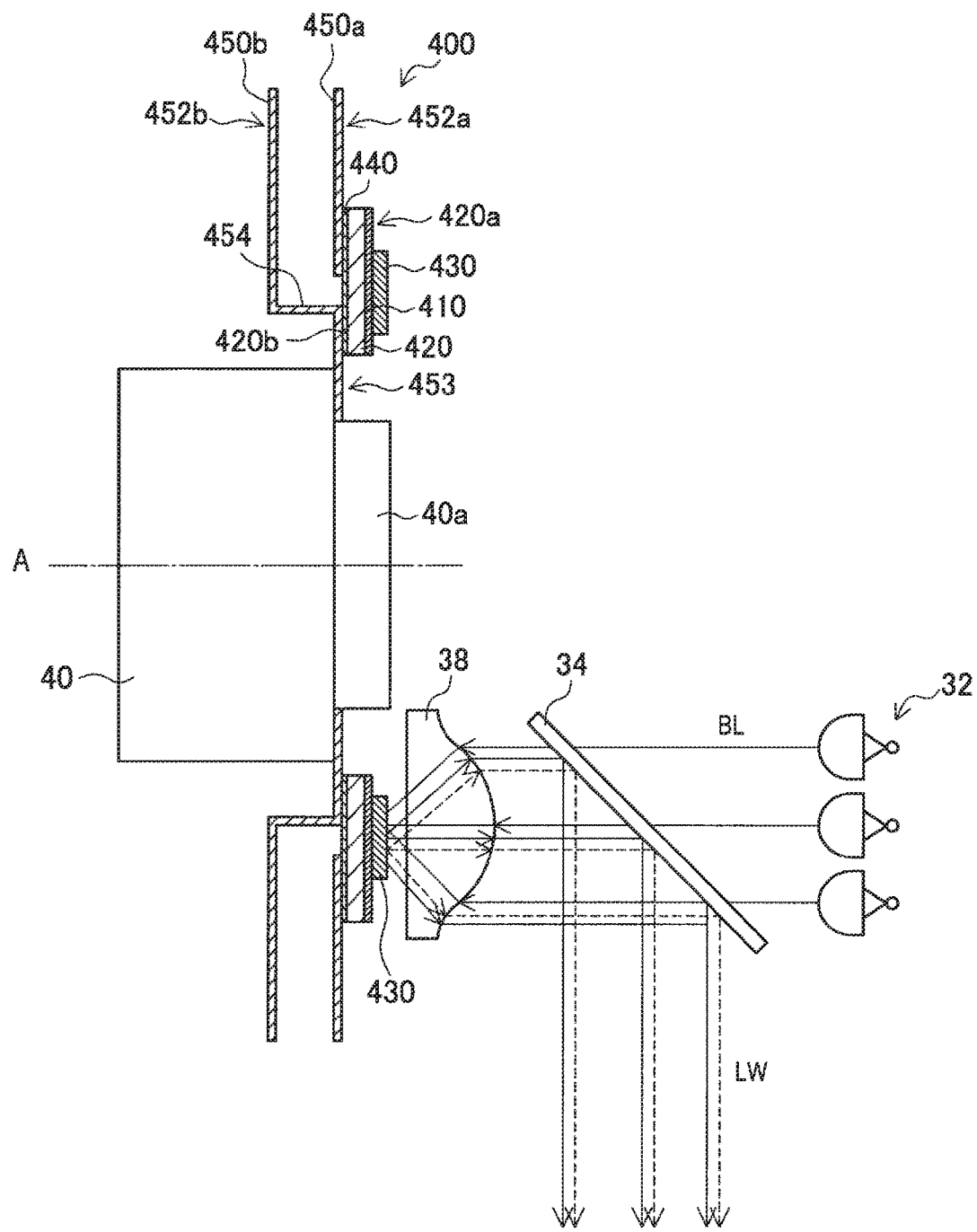
FIG. 13 is an illustration diagram showing an example of the configuration of a light source apparatus according to a third embodiment of the present disclosure.
Figure 14:
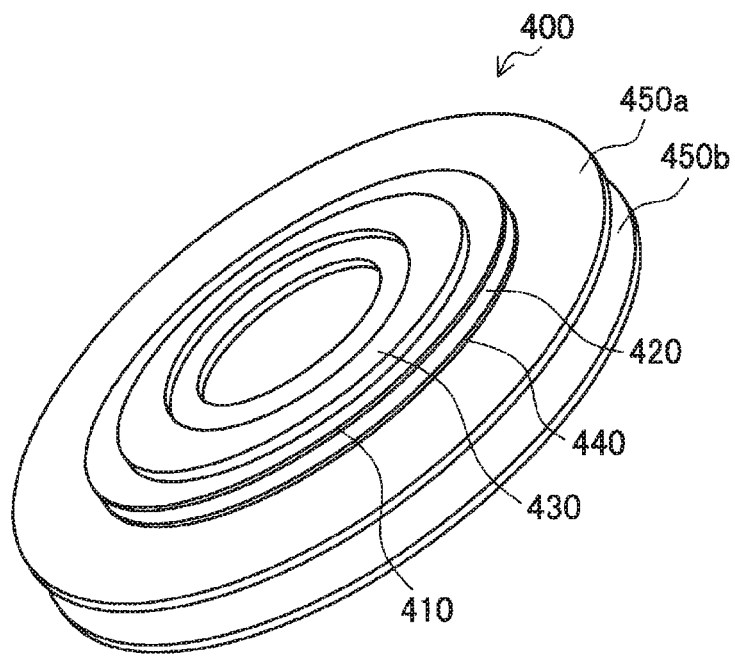
FIG. 14 is a perspective view of a phosphor wheel according to the embodiment as viewed from the substrate side.
Figure 15:
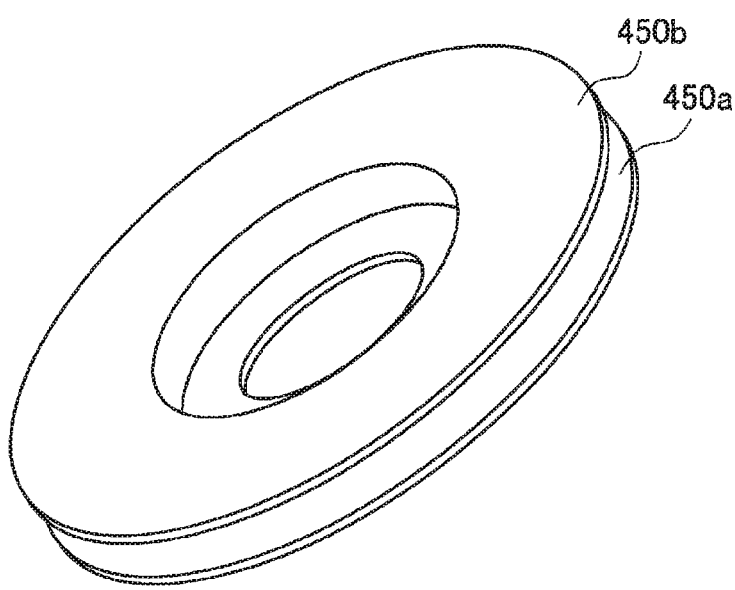
FIG. 15 is a perspective view of the phosphor wheel according to the embodiment as viewed from the rear surface side.

FIG. 13 shows a cross-sectional view of a phosphor wheel 400 according to this embodiment taken along a plane including the rotation axis A. FIG. 14 is a perspective view of the phosphor wheel 400 as viewed from the side of the surface on which a phosphor layer 430 is formed, and FIG. 15 is a perspective view of the phosphor wheel 400 as viewed from the opposite side. The phosphor wheel 400 is a reflection-type phosphor wheel 400 formed mainly of a relatively inexpensive metal material. The phosphor wheel 400 includes a disc-like substrate 420, a phosphor layer 430 formed on one surface 420a of the substrate 420 (the incidence side of excitation light BL), a light reflecting film 410 provided between the substrate 420 and the phosphor layer 430, and a plurality of heat dissipation fins 450a and 450b.

The substrate 420 is formed in a disc-like shape in which the center is opened. The substrate 420 may be formed of either a light transmissive material or a non-light transmissive material, and a substrate 420 made of molybdenum can provide a substrate 420 with high strength and optimal processability. In this embodiment, the substrate 420 is not mounted on the output shaft 40a of the motor 40. Therefore, it is sufficient that the width in the radius direction of the substrate 420 be a width with which the phosphor layer 430 can be formed and the heat dissipation fins 450a and 450b can be joined. Thus, even in the case where the substrate 420 is formed using a relatively expensive material, the increase in the cost needed for the substrate 420 can be reduced.

The phosphor layer 430 is formed on the side of the surface 420a of the substrate 420 on which excitation light BL is incident. The light reflecting film 410 is provided at least between the phosphor layer 430 and the substrate 420. The phosphor layer 430 and the light reflecting film 410 may have a similar configuration to the phosphor layer and the light reflecting film according to the first embodiment.

A joining layer 440 is formed of a thermally conductive adhesive or a thermally conductive adhesive sheet, and has the function of joining the first and second heat dissipation fins 450a and 450b (and a third heat dissipation fin 450c) to the substrate 420. The material, thickness, etc. of the joining layer 440 may be similar to those of a joining layer 340 of a phosphor wheel 300 according to the third embodiment.

In this embodiment, the first heat dissipation fin 450a and the second heat dissipation fin 450b are joined to a surface 420b of the substrate 420 on the opposite side to the surface 420a on which excitation light BL is incident. The first heat dissipation fin 450a has a ring shape in which the center is opened, and is provided in a shape of a circle concentric with the substrate 420. The second heat dissipation fin 450b has a ring shape in which the center is opened and is provided with a rising section 454 at its center in the radius direction, and is provided in a shape of a circle concentric with the substrate 420.

The first and second heat dissipation fins 450a and 450b are shaped by processing a metal sheet of aluminum, copper, or the like with a high thermal conductivity. Therefore, unlike a shaped product based on cutting or the like, relatively thin heat dissipation fins 450a and 450b can be obtained. Thus, the increase in the weight of the phosphor wheel 400 is suppressed, and the increase in the power consumption of the motor 40 can be reduced. The thickness of the first and second heat dissipation fins 450a and 450b shaped by sheet metal processing may be 0.3 mm, for example.

Of them, the first heat dissipation fin 450a is joined to an outer edge portion of the substrate 420, and has an outward extending portion 452a extending outward in the diameter direction of the substrate 420. The second heat dissipation fin 450b is joined to an inner edge portion of the substrate 420, and has an outward extending portion 452b extending outward in the diameter direction of the substrate 420 and an inward extending portion 453 extending inward in the diameter direction of the substrate 420. The second heat dissipation fin 450b has, in its central portion, the rising section 454 raised from the surface 420b of the substrate 420 in a direction perpendicular to the surface 420b. The inward extending portion 453 extends inward in the diameter direction of the substrate 420 on the same plane as the joint portion to the substrate 420, whereas the outward extending portion 452b extends outward in the diameter direction of the substrate 420 in a position apart from the substrate 420.

The phosphor wheel 400 according to this embodiment is attached to the output shaft 40a of the motor 40 at the inward extending portion 453 of the second heat dissipation fin 450b. Hence, the size (area) of the substrate 420 can be reduced, and it becomes easy for the substrate 420 to be formed of a relatively expensive material. Furthermore, in the case where the first and second heat dissipation fins 450a and 450b are shaped by sheet metal processing, the weight is reduced as the whole phosphor wheel 400, and the power consumption of the motor 40 can be reduced.

The first heat dissipation fin 450a and the second heat dissipation fin 450b overlap with each other when viewed in a direction perpendicular to the surface 420b of the substrate 420, and a gap is formed between the outward extending portions 452a and 452b. Thereby, the surface area of the phosphor wheel 400 in contact with air is increased, and the heat dissipation efficiency can be improved. Furthermore, by supplying cooling air to such a gap, the phosphor wheel 400 can be cooled more efficiently.

Moreover, the joint portion of the first heat dissipation fin 450a and the joint portion of the second heat dissipation fin 450b are apart in the joint portion to the substrate 420. Therefore, the joint area between the first and second heat dissipation fins 450a and 450b and the substrate 420 is made relatively small, and the stress generated in the substrate 420 by the difference in thermal expansion coefficient between the first and second heat dissipation fins 450a and 450b and the substrate 420 is reduced.

Figure 16:
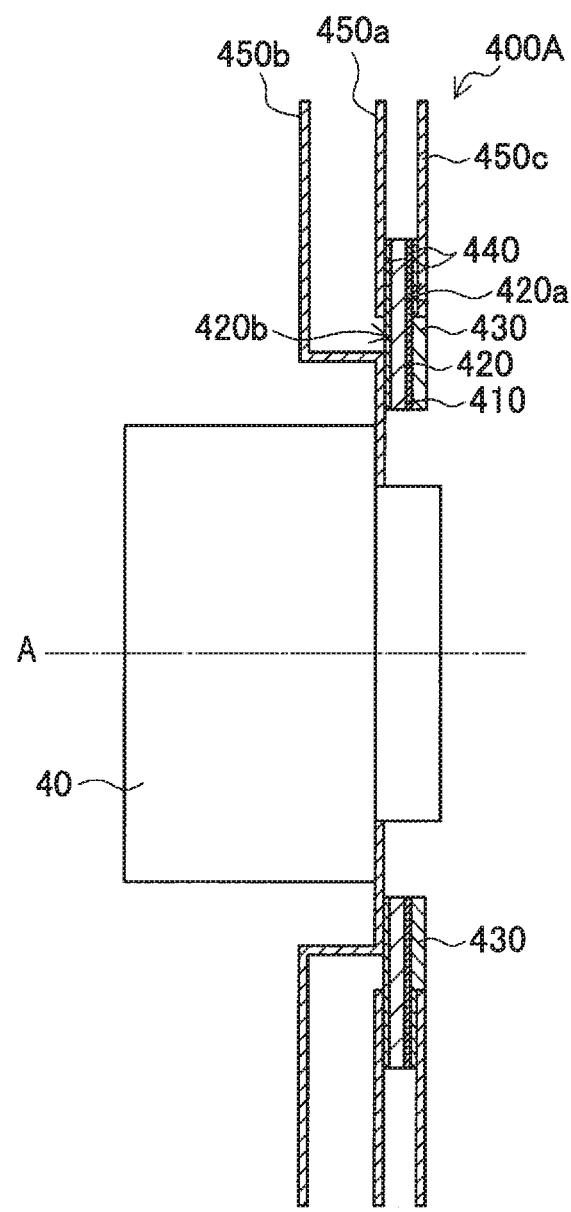
FIG. 16 is a cross-sectional view showing another example of the configuration of the phosphor wheel according to the embodiment.

In order to reduce the warpage of the substrate 420 caused by the stress generated by the difference in thermal expansion coefficient between the first and second heat dissipation fins 450a and 450b and the substrate 420, another heat dissipation fin may be joined to the surface 420a of the substrate 420 on which the phosphor layer 430 is formed. FIG. 16 shows a phosphor wheel 400A in which a third heat dissipation fin 450c is joined to the surface 420a of the substrate 420 on which the phosphor layer 430 is formed. In the phosphor wheel 400A, the third heat dissipation fin 450c is joined to correspond to the joint position of the first heat dissipation fin 450a, on the outside in the diameter direction with respect to the position of placement of the phosphor layer 430.

Therefore, at least the stress generated by the difference in thermal expansion coefficient between the first heat dissipation fin 450a and the substrate 420 is relaxed by the stress generated by the difference in thermal expansion coefficient between the third heat dissipation fin 450c and the substrate 420. As a result, the warpage of the substrate 420 can be reduced. When the third heat dissipation fin 450c is joined to the surface 420a on which the phosphor layer 430 is formed, the phosphor layer 430 can be prevented from being touched during the handling of the phosphor wheel 400, and the surface of the phosphor layer 430 can be prevented from being flawed.

In the case where the third heat dissipation fin 450c is provided, the surface area of the phosphor wheel 400A in contact with air is further increased, and the cooling efficiency can be improved. Furthermore, a gap opened in the direction toward the outer periphery of the phosphor wheel 400 is formed also between the first heat dissipation fin 450a and the third heat dissipation fin 450c; therefore, cooling air is likely to be supplied also to the gap, and the cooling efficiency is improved.

Furthermore, the third heat dissipation fin 450c may be provided so as to be in contact with the phosphor layer 430, and thereby the heat that the phosphor layer 430 has can be transferred to the third heat dissipation fin 450c more efficiently. Thus, the heat dissipation efficiency can be improved more.

Figure 17:
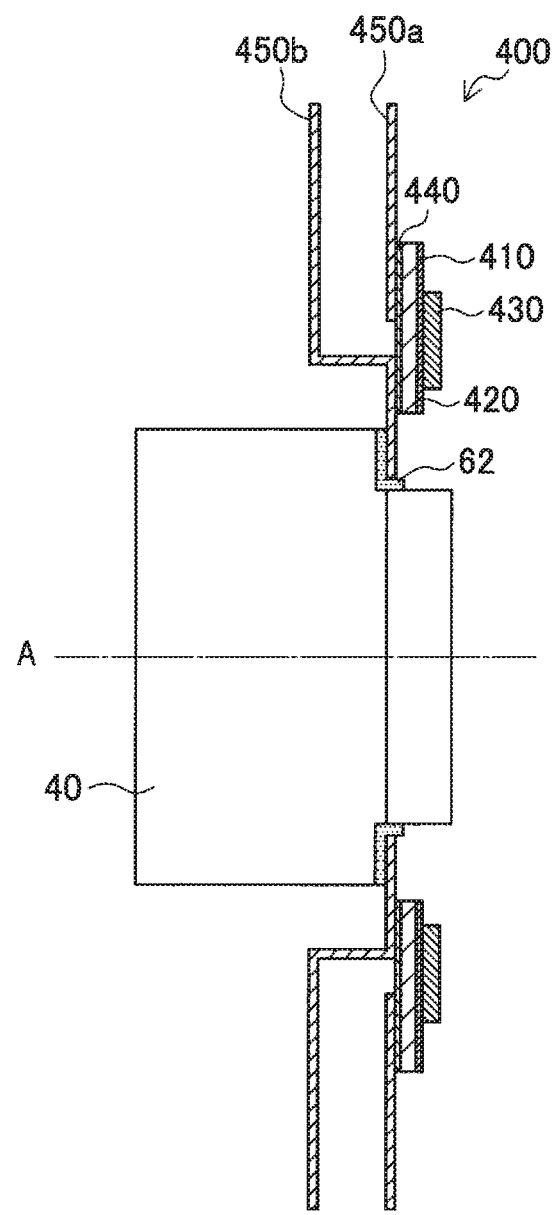
FIG. 17 is a cross-sectional view showing the phosphor wheel according to the embodiment attached to a motor via a heat insulating member.

Also in the case where the phosphor wheel 400 according to this embodiment is mounted on the motor 40, the phosphor wheel 400 may be attached via the heat insulating member 52 as shown in FIG. 17. Thereby, the transfer of the heat of the phosphor wheel 400 to the motor 40 can be lessened, and the reduction in the lifetime of the motor 40 can be prevented.

Thus, the phosphor wheels 400 and 400A according to the third embodiment of the present disclosure can obtain similar effects to the phosphor wheels according to the first and second embodiments. Furthermore, in the phosphor wheels 400 and 400A according to this embodiment, the joint portion of the first heat dissipation fin 450a and the joint portion of the second heat dissipation fin 450b to the substrate 420 are apart. In addition, the joining layer 440 that joins the substrate 420 and the first to third heat dissipation fins 450a to 450c is configured to have appropriate elasticity. Therefore, not only can the warpage of the substrate 420 due to the temperature increase of the phosphor wheels 400 and 400A be reduced, but the peeling of the first to third heat dissipation fins 450a to 450c can also be prevented.

Moreover, in the phosphor wheels 400 and 400A according to this embodiment, the weight of the first to third heat dissipation fins 450a to 450c is reduced, and the size (area) of the substrate 420 is reduced. Therefore, the increase in the weight of the entire phosphor wheels 400 and 400A is suppressed, and the increase in the power consumption of the motor 40 can be reduced.

<4. Fourth Embodiment>

Next, a phosphor wheel according to a fourth embodiment of the present disclosure is described. The phosphor wheel according to this embodiment is a reflection-type phosphor wheel similarly to the phosphor wheels according to the first to third embodiments. While the phosphor wheel according to the third embodiment is mounted on the motor at the inward extending portion extending inward in the diameter direction of the substrate, the phosphor wheel according to the fourth embodiment is mounted on the motor at the substrate.

Figure 18:
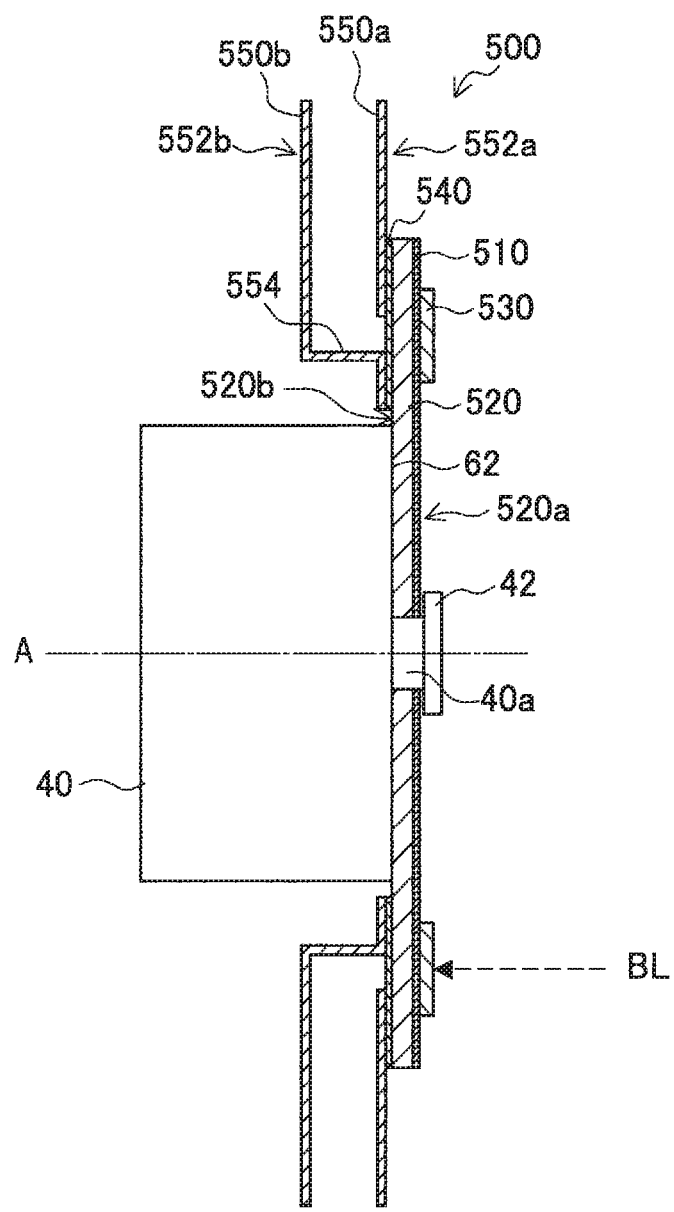
FIG. 18 is a cross-sectional view of a phosphor wheel according to a fourth embodiment of the present disclosure.

FIG. 18 shows a cross-sectional view of a phosphor wheel 500 according to this embodiment taken along a plane including the rotation axis A. In the phosphor wheel 500, a phosphor layer 530 is formed on a surface 520a to be irradiated with excitation light BL, and a first heat dissipation fin 550a and a second heat dissipation fin 550b are joined to a surface 520b on the opposite side to the surface 520a. The phosphor layer 530, a light reflecting film 510, and a joining layer 540 included in the phosphor wheel 500 may have a similar configuration to the phosphor layer 430, the light reflecting film 410, and the joining layer of the phosphor wheel 400 according to the third embodiment.

A substrate 520 may have a similar configuration to the substrate 420 of the phosphor wheel according to the third embodiment except that the substrate 520 is formed in a disc-like shape having, in its central portion, an opening into which the output shaft 40a of the motor 40 is inserted.

The first heat dissipation fin 550a is joined to an outer edge portion of the substrate 520, and has an outward extending portion 552a extending outward in the diameter direction of the substrate 520. The second heat dissipation fin 550b is joined to the center in the radius direction of the substrate 520, and has an outward extending portion 552b extending outward in the diameter direction of the substrate 520. The second heat dissipation fin 550b has a rising section 554 raised from the surface 520b of the substrate 520 in a direction perpendicular to the surface 520b. The outward extending portion 552b extends outward in the diameter direction of the substrate 520 in a position apart from the substrate 520. Except for such a shape, the second heat dissipation fin 550b may have a similar configuration to the second heat dissipation fin 550b of the phosphor wheel according to the third embodiment.

Thus, the phosphor wheel 500 according to the fifth embodiment of the present disclosure can obtain similar effects to the phosphor wheels according to the first and second embodiments. Furthermore, in the phosphor wheel 500 according to this embodiment, the joint portion of the first heat dissipation fin 550a and the joint portion of the second heat dissipation fin 550b to the substrate 520 are apart. In addition, the joining layer 540 that joins the substrate 520 and the first and second heat dissipation fins 550a and 550b is configured to have appropriate elasticity. Therefore, not only can the warpage of the substrate 520 due to the temperature increase of the phosphor wheel 500 be reduced, but the peeling of the first and second heat dissipation fins 550a and 550b can also be prevented.

<5. Fifth Embodiment>

Next, a light source apparatus and a phosphor wheel according to a fifth embodiment of the present disclosure are described. The light source apparatus according to this embodiment may be one used for the projection-type display apparatus illustrated in the first embodiment. Hence, herein, a description of the projection-type display apparatus is omitted. Further, a description of parts that can use a similar configuration to the light source apparatus and the phosphor wheel according to the first embodiment is omitted as appropriate.

[5.1. Example of Configuration of Light Source Apparatus]

Figure 19:
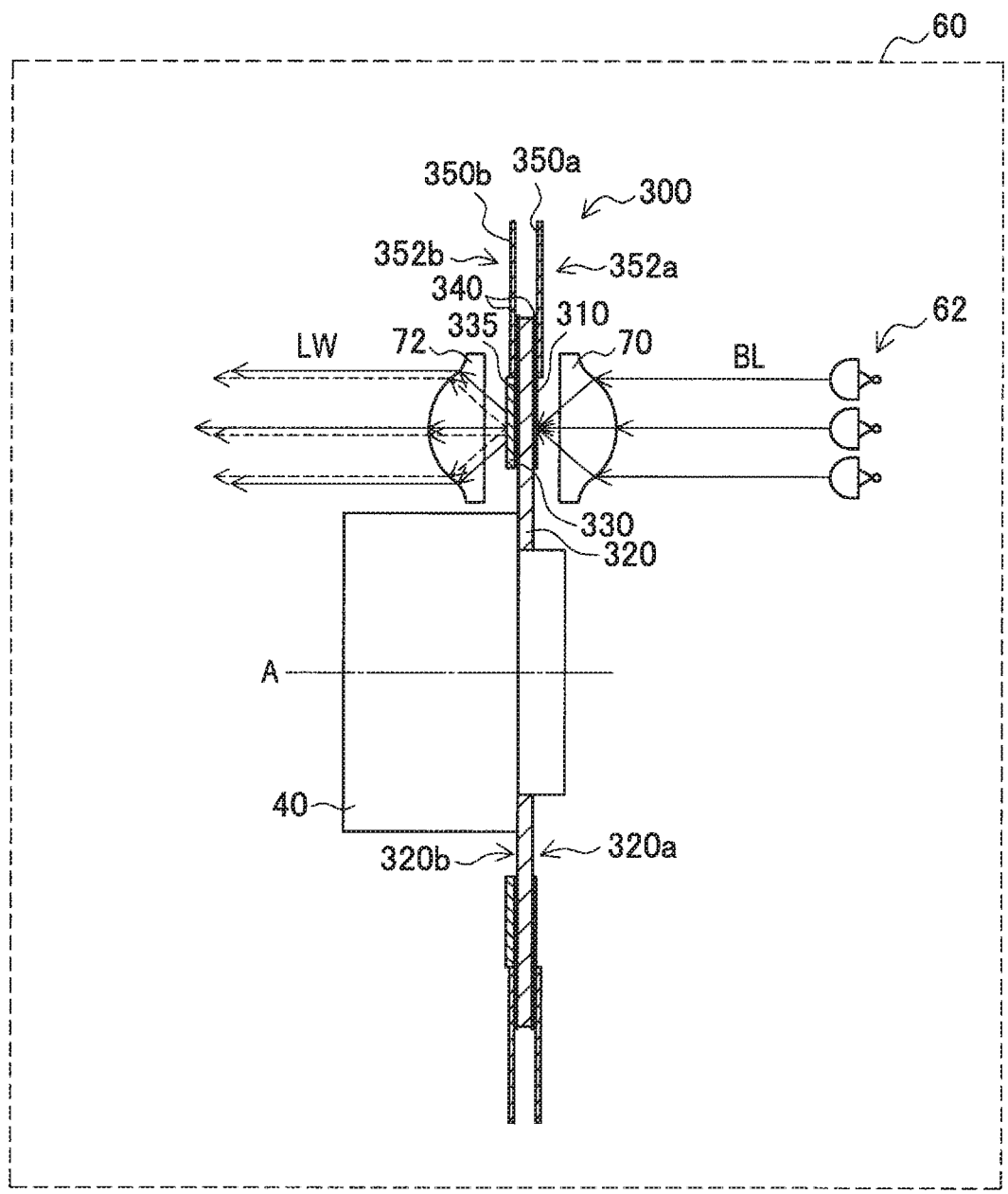
FIG. 19 is an illustration diagram showing an example of the configuration of a light source apparatus according to a fifth embodiment of the present disclosure.

First, an example of the configuration of the light source apparatus 60 according to this embodiment is described. FIG. 19 is a diagram showing an example of the rough configuration of the light source apparatus 60 according to this embodiment. The light source apparatus 60 is a light source apparatus that synthesizes laser light in the blue wavelength range and the light in the red wavelength range to the green wavelength range generated from a phosphor material excited by the laser light, that is, yellow light, and emits white light.

The light source apparatus 60 includes a solid state light source 62, a condensing lens 70, a lens 72, a phosphor wheel 300, and a motor 40. Of them, the solid state light source 62, the condensing lens 70, and the motor 40 may have a similar configuration to the solid state light source 32, the condensing lens 38, and the motor 40 in the light source apparatus 10 according to the first embodiment, respectively. However, the light source apparatus 60 does not include a dichroic mirror, and the excitation light BL emitted from the solid state light source 62 is directly incident on the condensing lens 70.

The phosphor wheel 300 absorbs excitation light BL in a prescribed wavelength range (the first wavelength) incident via the condensing lens 70 and emits light in a prescribed wavelength range (the second wavelength) using part of the excitation light BL, and transmits the fluorescently emitted light and the rest of the excitation light BL. In this embodiment, the light source apparatus 60 emits white light LW, and the phosphor wheel 300 combines fluorescently emitted light (yellow light) and excitation light (blue light) and emits white light to the lens 72. The configuration of the phosphor wheel 300 is described later in detail.

The lens 72 is placed on the optical path of the fluorescently emitted light and the excitation light BL emitted from the phosphor wheel 300, on the opposite side of the phosphor wheel 300 from the solid state light source 62. The lens 72 converts the diffused light emitted from the phosphor wheel 300 to parallel light, and emits the light. The lens 72 may be formed of one collimator lens, or may have a configuration using a plurality of lenses, for example.

[5.2. Example of Configuration of Phosphor Wheel]

Figure 20:
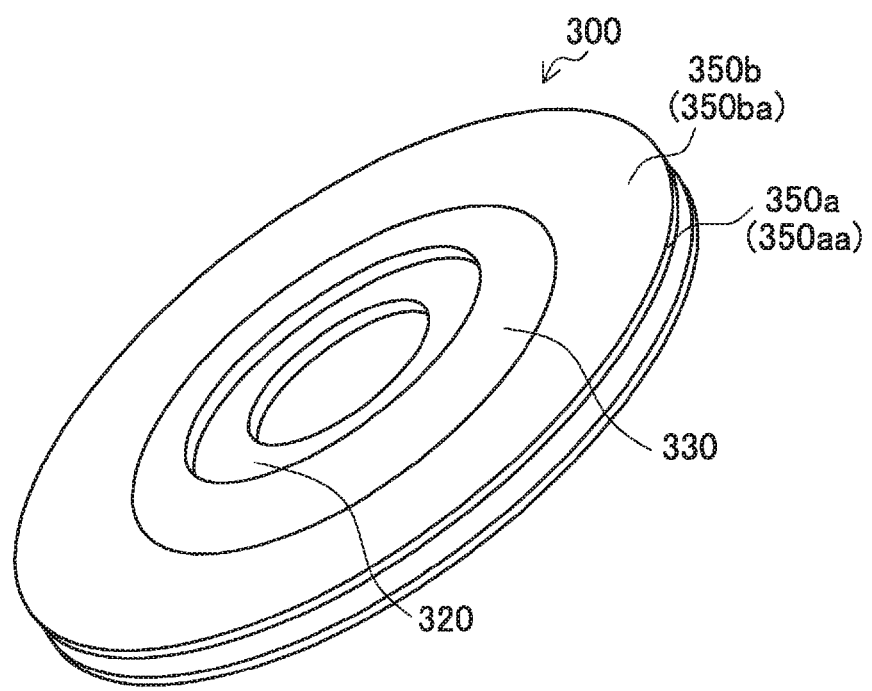
FIG. 20 is a perspective view of a phosphor wheel according to the embodiment.

Next, an example of the configuration of the phosphor wheel 300 according to this embodiment is described. FIG. 19 shows a cross-sectional view of the phosphor wheel 300 taken along a plane including the rotation axis A. FIG. 20 is a perspective view of the phosphor wheel 300 as viewed from the side of the surface on which a phosphor layer 330 is formed. The phosphor wheel 300 includes a disc-like light transmissive substrate 320, a phosphor layer 330 formed on one surface 320b of the light transmissive substrate 320 (the emission side of fluorescently emitted light and excitation light BL), and a plurality of heat dissipation fins 350a and 350b. The phosphor wheel 300 according to this embodiment does not include a light reflecting film.

(5.2.1. Light Transmissive Substrate)

The light transmissive substrate 320 is a disc-like substrate having a prescribed strength, and is formed of, for example, a light transmissive material such as glass or sapphire. In this embodiment, the light transmissive substrate 320 is formed using sapphire optimal in thermal conductivity. The phosphor wheel 300 is of a transmission type in which excitation light BL is transmitted and white light is emitted, and the light transmissive substrate 320 transmits excitation light BL. The thickness of the light transmissive substrate 320 is set in view of light transmissivity, weight, strength, etc. An anti-reflection film 310 is provided on, out of the surfaces of the light transmissive substrate 320, the surface on which the excitation light BL emitted from the solid state light source 62 is incident. Thereby, the reduction in the transmittance of the light transmitted through the light transmissive substrate 320 is suppressed.

(5.2.2. Phosphor Layer)

The phosphor layer 330 is formed on the light transmissive substrate 320 on the opposite side to the incidence side of excitation light BL. Also in this embodiment, in order to cause the light source apparatus 60 to emit white light, the phosphor layer 330 may be formed by applying a phosphor in which a YAG-based fluorescent material is mixed and dispersed in a binder onto the light transmissive substrate 320. In this embodiment, the phosphor layer 330 changes part of the excitation light BL incident via the light transmissive substrate 320 to fluorescently emitted light, and transmits the rest of the excitation light BL while it remains blue light. The thickness, phosphor concentration, etc. of the phosphor layer 330 are adjusted so that the light obtained by combining fluorescently emitted light and excitation light BL is white light. A dichroic mirror layer 335 is provided between the phosphor layer 330 and the light transmissive substrate 320. The dichroic mirror layer 335 has the function of transmitting the applied excitation light BL and reflecting the fluorescently emitted light emitted by the phosphor layer 330.

(5.2.3. Heat Dissipation Fin)

The heat dissipation fins 350a and 350b are joined to outer edge portions of both surfaces 320a and 320b of the light transmissive substrate 320, respectively, and have the function of dissipating heat from the phosphor wheel 100. The phosphor wheel 300 according to this embodiment is of the transmission type, and the heat dissipation fins 350a and 350b are joined to the light transmissive substrate 320 by a joining layer 340 in a position not overlapping with the phosphor layer 330.

The heat dissipation fins 350a and 350b have a ring shape in which the center is opened, and are provided in a shape of a circle concentric with the light transmissive substrate 320. The outer edges of the heat dissipation fins 350a and 350b substantially coincide with the outer edge of the light transmissive substrate 320. The heat dissipation fins 350a and 350b are shaped by processing a metal sheet of aluminum, copper, or the like with a high thermal conductivity. Therefore, unlike a shaped product based on cutting or the like, relatively thin heat dissipation fins 350a and 350b can be obtained. Thus, the increase in the weight of the phosphor wheel 300 is suppressed, and the increase in the power consumption of the motor 40 can be reduced. The thickness of the heat dissipation fins 350a and 350b shaped by sheet metal processing may be 0.3 mm, for example.

The heat dissipation fins 350a and 350b according to this embodiment are joined to corresponding front and back positions of both surfaces 320a and 320b of the light transmissive substrate 320, on the outside in the diameter direction with respect to the position of placement of the phosphor layer 330. That is, in accordance with the joint position of the heat dissipation fin 350b in the surface 320b of the light transmissive substrate 320 on which the phosphor layer 330 is formed, the heat dissipation fin 350a is joined to the surface 320a on the back side. Therefore, even in the case where the thermal expansion coefficients of the light transmissive substrate 320 and the heat dissipation fins 350a and 350b are different, the stresses generated by the difference in thermal expansion coefficient between the light transmissive substrate 320 and the heat dissipation fins 350a and 350b are canceled by the front and back sides of the light transmissive substrate 320.

Figure 21:
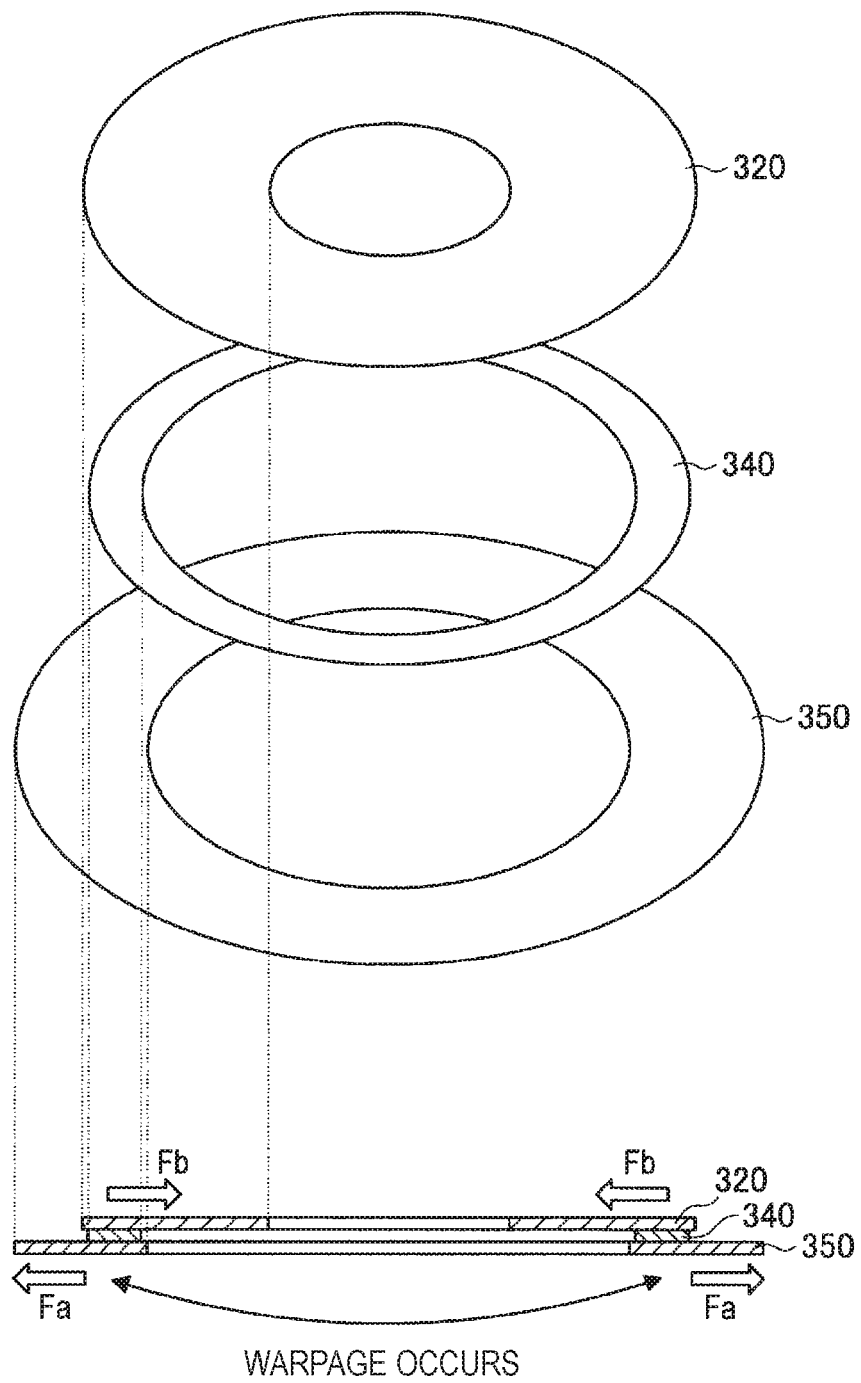
FIG. 21 is a diagram for describing the warpage of a phosphor wheel.

For example, when the thermal expansion coefficient of the heat dissipation fin 350 is larger than the thermal expansion coefficient of the light transmissive substrate 320, as shown in FIG. 21, tensile stress Fb directed inward in the diameter direction is generated in the light transmissive substrate 320, and tensile stress Fa directed outward in the diameter direction is generated in the heat dissipation fin 350. Therefore, in the case where the heat dissipation fin 350 is joined only to one surface of the light transmissive substrate 320, warpage occurs in the phosphor wheel.

In contrast, in the case where the heat dissipation fins 350a and 350b are joined to corresponding positions of both surfaces 320a and 320b of the light transmissive substrate 320, respectively, the stress generated between the heat dissipation fin 350a and the light transmissive substrate 320 and the stress generated between the heat dissipation fin 350b and the light transmissive substrate 320 are canceled. Therefore, the occurrence of warpage toward either one surface side of the phosphor wheel 300 can be lessened. It is preferable that the joint positions of the heat dissipation fins 350a and 350b to both surfaces 320a and 320b of the light transmissive substrate 320 coincide.

In the phosphor wheel 300 according to this embodiment, the heat dissipation fins 350a and 350b have outward extending portions 352a and 352b extending outward from an outer peripheral portion of the light transmissive substrate 320. The heat dissipation fins 350a and 350b are provided so as to overlap with each other when viewed in a direction perpendicular to the surface 320a of the light transmissive substrate 320, and a gap is formed between the outward extending portions 352a and 352b. Thereby, the surface area of the phosphor wheel 300 in contact with air is increased, and the heat dissipation efficiency can be improved. Furthermore, the phosphor wheel 300 can be cooled more efficiently by supplying cooling air to the gap between the outward extending portions 352a and 352b.

Moreover, the heat dissipation fin 350b joined to the surface 320b on which the phosphor layer 330 is formed may be provided so as to be in contact with the phosphor layer 330, and thereby the heat that the phosphor layer 330 has can be efficiently transferred to the heat dissipation fin 350b. Therefore, the heat dissipation efficiency can be improved more.

Also in the phosphor wheel 300 according to this embodiment, the gap between the outward extending portions 352a and 352b is opened in the direction toward the outer periphery of the phosphor wheel 300. Thus, in order to improve the heat dissipation efficiency, as shown in FIG. 22, cooling air may be introduced into the gap between the outward extending portions 352a and 352b in an area corresponding to the irradiation position of excitation light BL.

Figure 23:
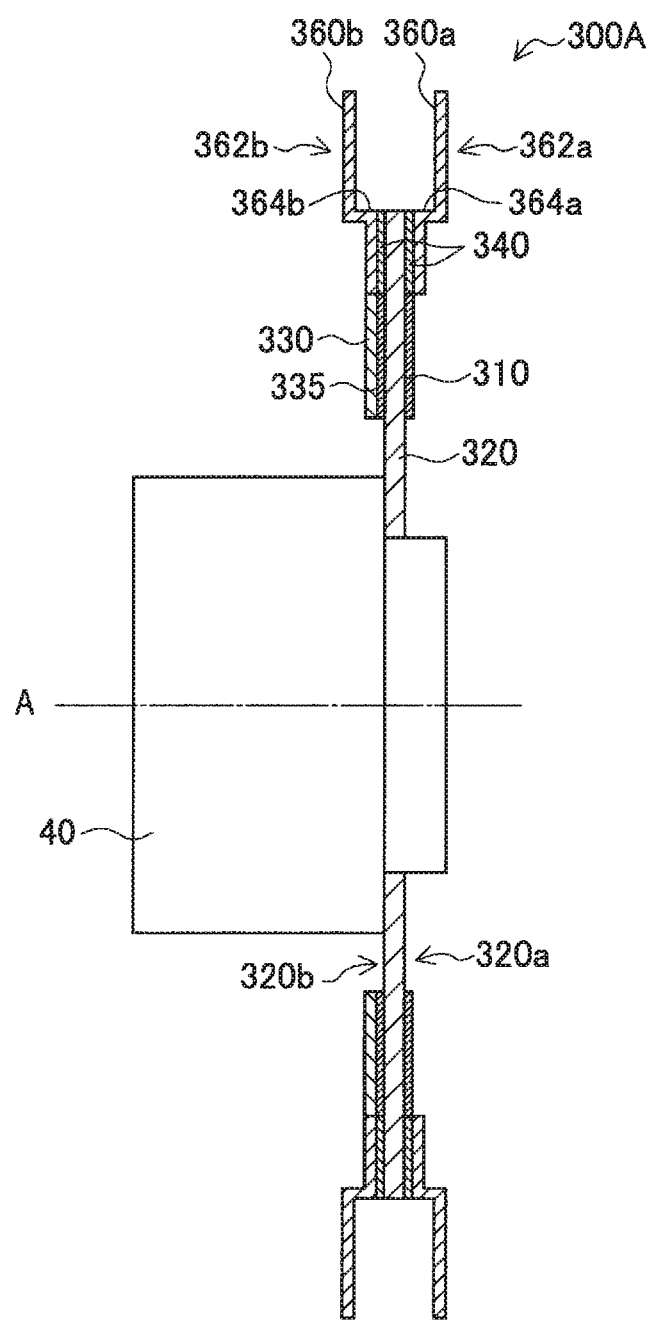
FIG. 23 is a cross-sectional view showing another example of the configuration of the phosphor wheel according to the embodiment.

The heat dissipation fins 350a and 350b may be provided with a rising section in order to increase the surface area of the area in contact with air in the heat dissipation fins 350a and 350b and to increase the width of the gap to which cooling air can be supplied. FIG. 23 shows a phosphor wheel 300A including heat dissipation fins 360a and 360b having rising sections 364a and 364b that extend in a direction crossing the surfaces 320a and 320b of the light transmissive substrate 320.

The rising sections 364a and 364b are formed to be raised in a direction away from and perpendicular to the substrate 320 at an outer edge portion of the substrate 320. Thereby, the width of the gap between outward extending portions 362a and 362b is expanded, and the surface area of the heat dissipation fins 360a and 360b is increased. Therefore, the heat dissipation efficiency of the phosphor wheel 300A can be improved.

Figure 24:
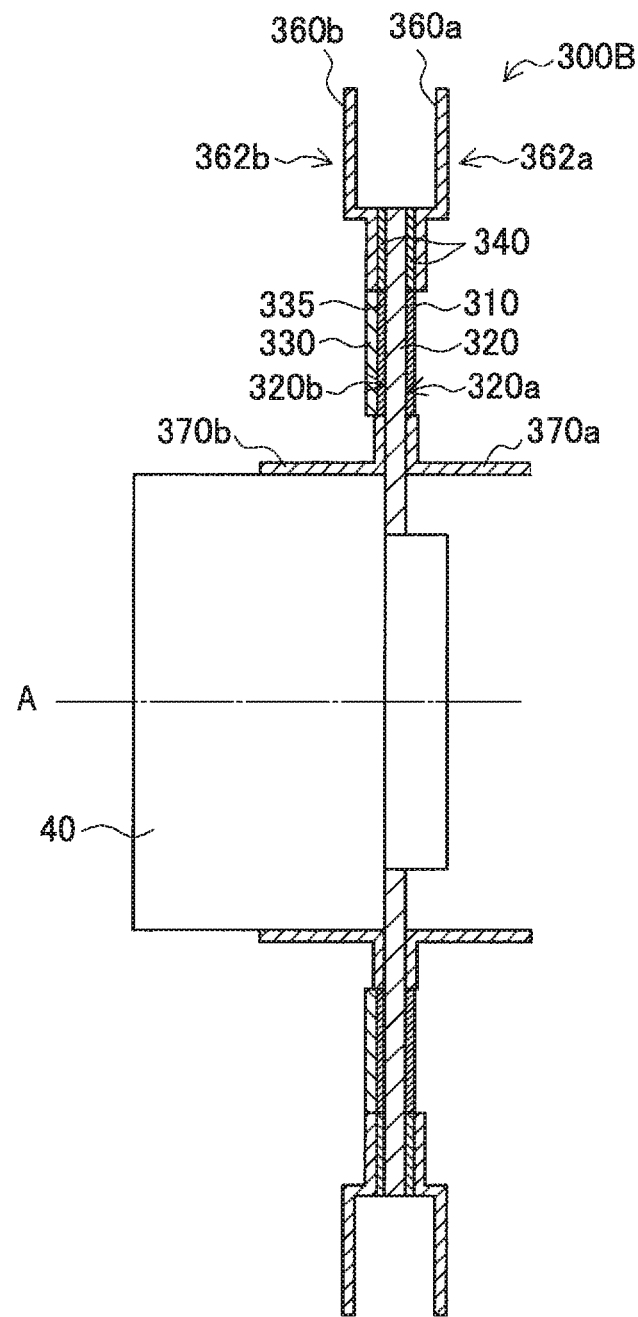
FIG. 24 is a cross-sectional view showing still another example of the configuration of the phosphor wheel according to the embodiment.

In order to further improve the cooling efficiency of the phosphor wheel 300, a plurality of heat dissipation fins may be provided on at least one of the surfaces 320a and 320b of the light transmissive substrate 320. FIG. 24 shows a phosphor wheel 300B in which second heat dissipation fins 370a and 370b, as well as the first heat dissipation fins 360a and 360b, are provided on both surfaces 320a and 320b of the light transmissive substrate 320, respectively. The second heat dissipation fins 370a and 370b are joined to both surfaces 320a and 320b of an area on the inside in the diameter direction with respect to the area where the phosphor layer 330 is formed, and are raised from the surfaces 320a and 320b of the light transmissive substrate 320 in a direction perpendicular to the surfaces 320a and 320b.

By providing the second heat dissipation fins 370a and 370b as well as the first heat dissipation fins 360a and 360b, the surface area of the phosphor wheel 300B in contact with air is increased, and the heat dissipation efficiency can be improved. Furthermore, by providing the second heat dissipation fins 370a and 370b on the inside in the diameter direction with respect to the position of placement of the phosphor layer 330, heat can be efficiently dissipated from the phosphor layer 330 via the outside in the diameter direction and the inside in the diameter direction.

Since the phosphor wheel 300B is of the transmission type, the first heat dissipation fins 360a and 360b and the second heat dissipation fins 370a and 370b are provided so as not to obstruct the light incident on and emitted from the phosphor wheel 300B. The size, height, shape, etc. of the first heat dissipation fins 360a and 360b and the second heat dissipation fins 370a and 370b may be set in view of the placement space, weight, cooling efficiency, etc. of the phosphor wheel 300B in the light source apparatus 60.

Figure 25:
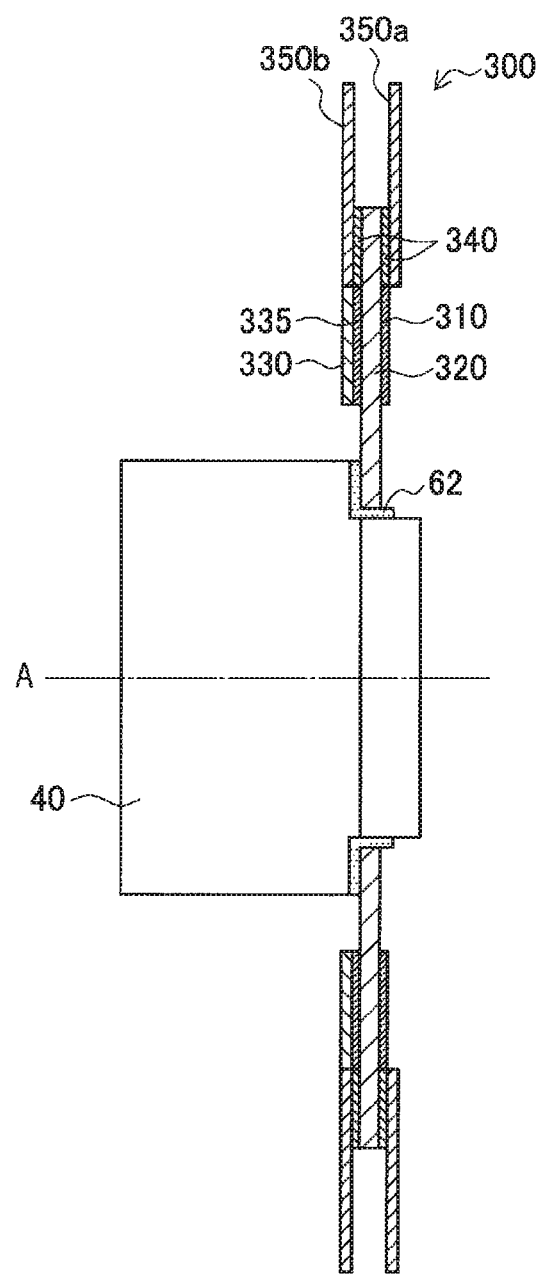
FIG. 25 is a cross-sectional view showing the phosphor wheel according to the embodiment attached to a motor via a heat insulating member.

Also in the case where the phosphor wheel 300 according to this embodiment is mounted on the motor 40, the phosphor wheel 300 may be attached via the heat insulating member 52 as shown in FIG. 25. Thereby, the transfer of the heat of the phosphor wheel 300 to the motor 40 can be lessened, and the reduction in the lifetime of the motor 40 can be prevented.

(5.2.4. Joining Layer)

The joining layer 340 is formed of a thermally conductive adhesive or a thermally conductive adhesive sheet, and has the function of joining the heat dissipation fins 350a and 350b (360a, 360b, 370a, and 370b) to the light transmissive substrate 320. In this embodiment, the light transmissive substrate 320 is made of bulk glass, and the heat dissipation fins 350a and 350b are made of aluminum; therefore, the thermal expansion coefficient of the light transmissive substrate 320 and the thermal expansion coefficient of the heat dissipation fins 350a and 350b are different. As mentioned above, by making the joint positions of the heat dissipation fins 350a and 350b coincide, the stresses generated between the heat dissipation fins 350a and 350b and the light transmissive substrate 320 are canceled.

However, in this embodiment, the joining layer 340 is provided with elasticity, and the stress generated between the heat dissipation fins 350a and 350b and the light transmissive substrate 320 is reduced also by the elastic force. Furthermore, by the joining layer 340 having elasticity, the heat dissipation fins 350a and 350b are less likely to peel off from the light transmissive substrate 320. In this embodiment, the joining layer 340 is formed using a silicon-based adhesive having thermal conductivity.

Table 1 shows the maximum shear stress (MPa) that was given to a light transmissive substrate when the light transmissive substrate and a heat dissipation fin were joined while the thickness of a joining layer made of a silicon-based adhesive was changed and the phosphor wheel was heated in the same conditions. As shown in Table 1, it can be seen that the maximum shear stress increases as the thickness of the joining layer 340 decreases. That is, it can be seen that the elastic force increases as the thickness of the joining layer 340 increases.

TABLE 1

| Thickness of joining layer (mm) | Maximum shear stress (MPa) |
| --- | --- |
| 0.07 | 0.45 |
| 0.1 | 0.4 |
| 0.2 | 0.16 |
| 0.3 | 0.06 |
| 0.5 | 0.027 |

Figure 26:
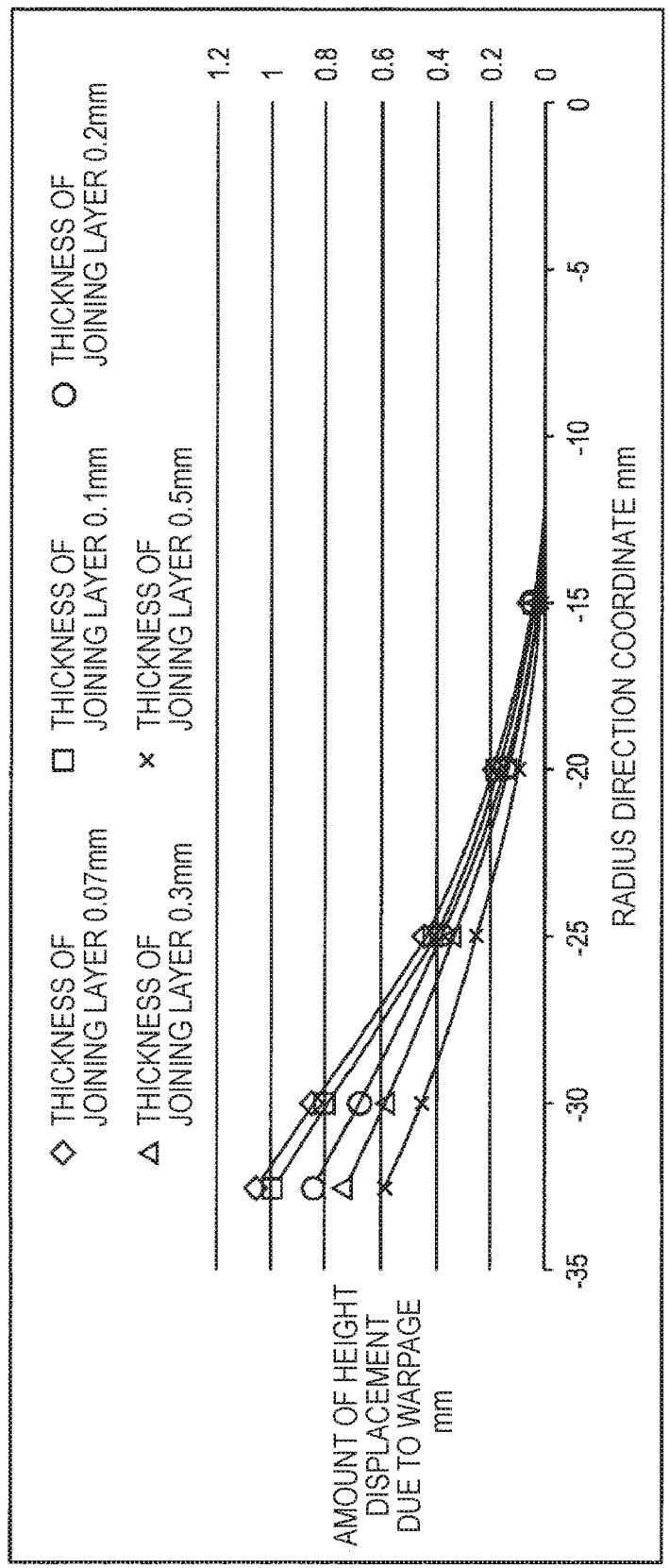
FIG. 26 is a diagram showing the relationship between the thickness of a joining layer and the warpage of a substrate.

FIG. 26 shows the relationship between the thickness of the joining layer and the warpage of the light transmissive substrate. The horizontal axis represents the positional coordinate (mm) in the radius direction on the assumption that the center point of the light transmissive substrate is 0, and the vertical axis represents the amount of displacement (mm) in the height of the light transmissive substrate at each position on the assumption that the height position of the center point of the light transmissive substrate is 0. The light transmissive substrate is a substrate with a radius of 35 mm (diameter: 70 mm); the amount of height displacement occurring when the light transmissive substrate and the heat dissipation fin were joined as shown in FIG. 21 and heating was performed was found. As shown in FIG. 26, it can be seen that the degree of warpage occurring decreases as the thickness of the joining layer increases.

Thus, it is found that the thickness of the joining layer is preferably larger in order to prevent the peeling between the light transmissive substrate and the heat dissipation fin while suppressing the warpage of the light transmissive substrate. However, if the thickness of the joining layer is too large, the thermal conductivity may be reduced. Further, if the thickness of the joining layer is too large, the amount of the thermally conductive adhesive used is increased and the cost is increased, and the weight of the phosphor wheel is increased and the power consumption of the motor is increased. Thus, the thickness of the joining layer is preferably set to a value in the range of 0.1 to 0.5 mm, and more preferably set to a value in the range of 0.2 to 0.4 mm, for example.

When the joining layer 340 is provided with elasticity while the joint positions of the heat dissipation fins 350a and 350b (360a, 360b, 370a, and 370b) joined to both surfaces 320a and 320b of the light transmissive substrate 320 are made to coincide, the warpage of the light transmissive substrate 320 and the peeling of the heat dissipation fins 350a and 350b can be effectively reduced. However, when the suppression of the occurrence of warpage of the light transmissive substrate 320 is achieved by providing the joining layer 340 with proper elasticity, the joint positions of the heat dissipation fins 350a and 350b joined to both surfaces 320a and 320b of the light transmissive substrate 320 do not need to coincide.

Thus, the phosphor wheels 300, 300A, and 300B according to the fifth embodiment of the present disclosure can obtain similar effects to the phosphor wheel according to the first embodiment. Furthermore, in the phosphor wheels 300, 300A, and 300B according to this embodiment, the heat dissipation fins 350a and 350b (360a, 360b, 370a, and 370b) joined to both surfaces 320a and 320b of the light transmissive substrate 320 are joined to corresponding positions on the front and back sides. Therefore, the warpage of the light transmissive substrate 320 due to the temperature increase of the phosphor wheels 300, 300A, and 300B can be reduced.

Furthermore, in the phosphor wheels 300, 300A, and 300B according to this embodiment, the joining layer 340 that joins the light transmissive substrate 320 and the heat dissipation fins 350a and 350b is configured to have appropriate elasticity. Therefore, not only can the warpage of the light transmissive substrate 320 due to the temperature increase of the phosphor wheels 300, 300A, and 300B be reduced, but the peeling of the heat dissipation fins 350a and 350b can also be prevented.

<6. Sixth Embodiment>

Next, a phosphor wheel according to a sixth embodiment of the present disclosure is described. The phosphor wheel according to this embodiment is one in which the heat dissipation fin in the phosphor wheels according to the fourth and fifth embodiments is formed of a carbon fiber-mixed shaped product. The basic configuration of the phosphor wheel according to this embodiment may be a similar configuration to the phosphor wheels according to the fourth and fifth embodiments.

In this embodiment, the substrate on which the phosphor layer is formed is formed of bulk glass or sapphire glass. The heat dissipation fin joined to the substrate is formed of a carbon fiber-mixed shaped product. The thermal expansion coefficients of the substrate and the heat dissipation fin are close to each other. Therefore, even when heat is generated in the phosphor layer and the temperature of the phosphor wheel is increased, thermal stress is less likely to be applied to the substrate, and the occurrence of warpage of the phosphor wheel can be suppressed. Furthermore, the carbon fiber-mixed shaped product is light in weight, and the load on the motor 40 can be lessened.

<7. Seventh Embodiment>

Next, a phosphor wheel according to a seventh embodiment of the present disclosure is described. The phosphor wheel according to this embodiment is a transmission-type phosphor wheel similarly to the phosphor wheel according to the fifth embodiment. Also a light source apparatus according to this embodiment may be one used for the projection-type display apparatus illustrated in the first embodiment. Also the basic configuration of the light source apparatus may be a similar configuration to the light source apparatus described in the fifth embodiment. Hence, herein, a description of the basic configuration of the projection-type display apparatus and the light source apparatus is omitted, and a description is given with a focus on the configuration of the phosphor wheel according to this embodiment.

In the transmission-type phosphor wheel, the substrate on which the phosphor layer is formed needs to be light transmissive, and a light transmissive substrate formed of glass, sapphire, or the like and having a prescribed strength is generally used. Such a light transmissive substrate is lower in thermal conductivity than metal materials, and the temperature of the phosphor layer tends to be a high temperature. Consequently, the fluorescence conversion efficiency in the phosphor layer may be reduced, and the reliability of the power stability of the light source may be reduced. The phosphor wheel according to this embodiment can improve the heat dissipation efficiency even when it is a transmission-type phosphor wheel.

Figure 27:
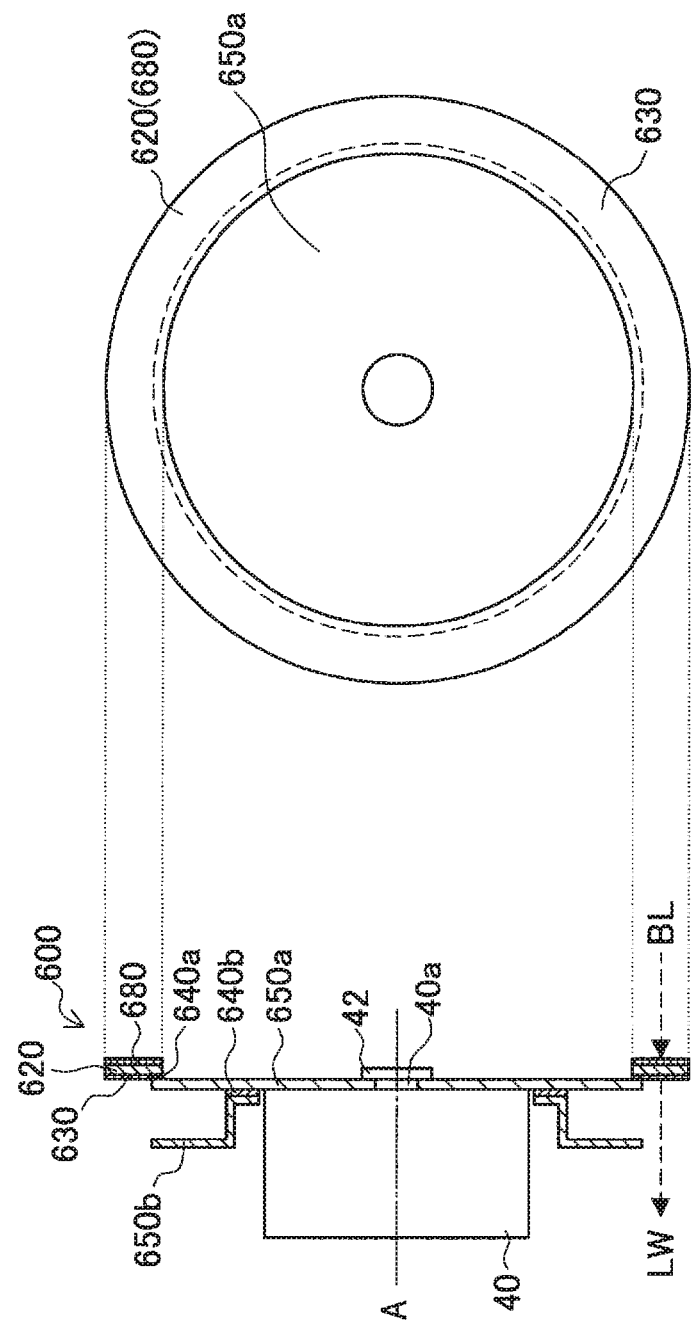
FIG. 27 is a cross-sectional view of a phosphor wheel according to a seventh embodiment of the present disclosure.
Figure 28:
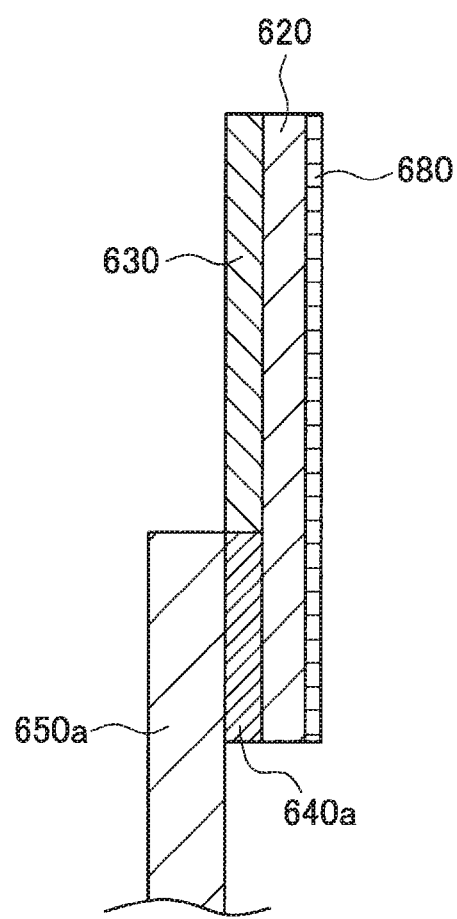
FIG. 28 is a partial cross-sectional view of the phosphor wheel according to the embodiment.

FIG. 27 shows an illustration diagram showing the configuration of a phosphor wheel 600 according to this embodiment, which is a cross-sectional view of the phosphor wheel 600 taken along a plane including the rotation axis A and a front view of the phosphor wheel 600 as viewed from the incidence side of excitation light BL. FIG. 28 is an enlarged cross-sectional view showing a light transmissive substrate 620 joined to an outer edge portion of a first heat dissipation fin 650a of the phosphor wheel 600. The phosphor wheel 600 is a transmission-type phosphor wheel formed mainly of a metal material. The phosphor wheel 600 includes a light transmissive substrate 620, a phosphor layer 630, a first heat dissipation fin 650a, a second heat dissipation fin 650b, a first joining layer 640a, and a second joining layer 640b.

The light transmissive substrate 620 is a disc-like substrate having a prescribed strength, and is formed of, for example, bulk glass, water glass, sapphire, or the like. The light transmissive substrate 620 has an opening at its center, and is joined by the first joining layer 640a to an outer edge portion of the surface of the first heat dissipation fin 650a on the opposite side to the incidence side of excitation light BL. The size of the opening at the center is set to an appropriate size, and may be set large in order to suppress the increase in cost in the case where the light transmissive substrate 620 is formed of a relatively expensive material such as sapphire and to reduce the weight of the phosphor wheel 600.

The phosphor layer 630 is formed in an area that is in a surface 620b of the light transmissive substrate 620 on the opposite side to a surface 620a to be irradiated with excitation light BL and that does not overlap with the first heat dissipation fin 650a. That is, the phosphor layer 630 is formed in an area that is in the surface 620b of the light transmissive substrate 620 and that extends outward in the diameter direction from an outer peripheral portion of the first heat dissipation fin 650a. The phosphor layer 630 may have a similar configuration to the phosphor layer 430 of the phosphor wheel according to the fifth embodiment.

A dichroic mirror layer 680 is formed on the surface 620a of the light transmissive substrate 620 on the incidence side of excitation light BL. The dichroic mirror layer 680 has the function of transmitting the applied excitation light BL to the light transmissive substrate 620 side and reflecting the fluorescently emitted light emitted by the phosphor layer 630. Therefore, the fluorescently emitted light does not return to the incidence side of excitation light BL. In this event, the dichroic mirror layer 680 may be configured to reflect the fluorescently emitted light in a Lambertian manner.

The first and second heat dissipation fins 650a and 650b are formed of a metal material such as aluminum or copper with a high thermal conductivity. In particular, by forming the first and second heat dissipation fins 650a and 650b by processing a metal sheet, the thickness can be made relatively small, and the weight of the phosphor wheel 600 can be reduced.

The phosphor wheel 600 according to this embodiment is mounted on the motor 40 at the first heat dissipation fin 650a. The first heat dissipation fin 650a is formed in a disc-like shape having, at its center, an opening into which the output shaft 40a of the motor 40 is inserted. The light transmissive substrate 620 is joined to an outer edge portion of the surface of the first heat dissipation fin 650a on the incidence side of excitation light BL via the first joining layer 640a. Further, the second heat dissipation fin 650b is joined to the surface of the first heat dissipation fin 650a on the opposite side to the surface on the incidence side of excitation light BL via the second joining layer 640b.

The second heat dissipation fin 650b is formed in a shape of a circle concentric with the first heat dissipation fin 650a. The second heat dissipation fin 650b is, at its inner edge portion, joined to the first heat dissipation fin 650a and is, at its central portion, raised in a direction orthogonal to the surface of the first heat dissipation fin 650a. Thus, an outer edge portion of the second heat dissipation fin 650b is apart from the first heat dissipation fin 650a.

The first heat dissipation fin 650a and the second heat dissipation fin 650b overlap with each other when viewed in a direction orthogonal to the surface 620a of the light transmissive substrate 620. A gap opened in the direction toward the outer periphery of the phosphor wheel 600 is formed between the first heat dissipation fin 650a and the second heat dissipation fin 650b. Therefore, the surface area of the area in contact with air in the phosphor wheel 600 is increased, and the heat dissipation efficiency is improved. Furthermore, the temperature increase of the phosphor layer 630 can be effectively suppressed by a configuration in which cooling air is supplied to the gap between the first heat dissipation fin 650*a* and the second heat dissipation fin 650*b* in an area corresponding to the irradiation position of excitation light BL.

The diameter of the second heat dissipation fin 650*b* is set so as not to obstruct the application of excitation light BL. For example, the diameter of the second heat dissipation fin 650*b* may be not more than the diameter of the first heat dissipation fin 650*a,* and is set in view of the weight, heat dissipation efficiency, etc. of the phosphor wheel 600. Otherwise, the material, thickness, etc. of the first and second heat dissipation fins 650*a* and 650*b* may be similar to the material, thickness, etc. of the heat dissipation fin of the phosphor wheel according to the fifth embodiment.

For example, the first and second heat dissipation fins 650*a* and 650*b* may be shaped by processing a metal sheet of aluminum with a thickness of 0.3 mm. The first and second heat dissipation fins 650*a* and 650*b* made of aluminum can improve the heat dissipation efficiency of the phosphor wheel 600 because of their higher heat dissipation properties than those of the light transmissive substrate 620 made of bulk glass, sapphire, or the like. Furthermore, the first and second heat dissipation fins 650*a* and 650*b* made of aluminum can reduce the cost.

The first and second joining layers 640*a* and 640*b* are formed using a thermally conductive adhesive or a thermally conductive adhesive sheet. The first and second joining layers 640*a* and 640*b* may have a similar configuration to the joining layer of the phosphor wheel according to the fifth embodiment.

Also the phosphor wheel 600 according to this embodiment may be mounted on the output shaft 40*a* of the motor 40 via a heat insulating member as illustrated in FIG. 7 and FIG. 17. Thereby, an event in which the heat of the phosphor wheel 600 is transferred to the motor 40 and the lifetime of the motor 40 is reduced can be prevented.

Thus, the phosphor wheel 600 according to the seventh embodiment of the present disclosure can obtain similar effects to the phosphor wheel according to the first embodiment. Furthermore, in the phosphor wheel 600 according to this embodiment, the light transmissive substrate 620 on which the phosphor layer 630 is formed is joined to an outer edge portion of the first heat dissipation fin 650*a*. In addition, the second heat dissipation fin 650*b* is joined to the first heat dissipation fin 650*a,* and the surface area of the area in contact with air in the phosphor wheel 600 is expanded. Therefore, even a transmission-type phosphor wheel 600 using a light transmissive substrate 620 with a relatively low thermal conductivity can improve the heat dissipation efficiency.

Furthermore, the phosphor wheel 600 according to this embodiment is configured using the first and second heat dissipation fins 650*a* and 650*b* made of a relatively inexpensive metal material as main components, and the size (area) of the light transmissive substrate 620 is reduced. Therefore, even a light transmissive substrate 620 made of a relatively expensive light transmissive material can suppress the increase in cost.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification. Further, the examples described in the above embodiments and Modification Examples may be combined as appropriate.

Additionally, the present technology may also be configured as below.

(1)

A phosphor wheel including:
a disc-like substrate;
a phosphor layer formed on the substrate; and
a plurality of heat dissipation fins overlapping with each other when viewed in a direction orthogonal to a surface of the substrate.

(2)

The phosphor wheel according to (1), wherein a gap formed between the plurality of heat dissipation fins is opened in a direction toward an outer periphery of the substrate.

(3)

The phosphor wheel according to (1) or (2), wherein the plurality of heat dissipation fins form a circle concentric with the disc-like substrate.

(4)

The phosphor wheel according to any one of (1) to (3), wherein the substrate and the heat dissipation fin are joined by a thermally conductive adhesive or a thermally conductive adhesive sheet.

(5)

The phosphor wheel according to (4), wherein a joining layer formed of the thermally conductive adhesive or the thermally conductive adhesive sheet has elasticity.

(6)

The phosphor wheel according to (5), wherein a thickness of the joining layer is a value in a range of 0.1 to 0.5 mm.

(7)

The phosphor wheel according to any one of (1) to (6), wherein at least one of the plurality of heat dissipation fins has a rising section extending in a direction crossing the surface of the substrate.

(8)

The phosphor wheel according to (7), wherein one of the plurality of heat dissipation fins has the rising section formed in a shape of a circle concentric with the substrate, and another heat dissipation fin is formed to extend from the rising section.

(9)

The phosphor wheel according to (8), wherein a heat dissipation structure unit integrally shaped to include the plurality of heat dissipation fins and the rising section is provided on a side of another surface different from one surface of the substrate on which the phosphor layer is formed.

(10)

The phosphor wheel according to (9), wherein the phosphor wheel is a reflection-type phosphor wheel configured to reflect applied light, and the substrate is formed of one of the plurality of heat dissipation fins constituting the heat dissipation structure unit.

(11)

The phosphor wheel according to (9), wherein the heat dissipation structure unit is a constituent part separate from the substrate, and the heat dissipation structure unit is joined to the substrate.

(12)
The phosphor wheel according to (9) or (10), wherein a rising position of the rising section of the heat dissipation structure unit provided on the side of the other surface corresponds to a position of formation of the phosphor layer of the one surface.

(13)
The phosphor wheel according to any one of (9) to (12), wherein, when a distance from a center of the substrate to an irradiation position of the phosphor layer is denoted by R and a diameter of a portion connecting the substrate and the rising section is denoted by D, a relation of $$D/2<R$$

is satisfied.

(14)
The phosphor wheel according to (13), wherein, when the total surface area of the heat dissipation structure unit and the substrate is denoted by $S_A$ and the surface area of a portion that is in the substrate on which the phosphor layer is formed and the heat dissipation fin joined to the substrate and that is located on an outer periphery side with respect to the irradiation position is denoted by S, $0.4 \leq S/S_A \leq 0.6$ is satisfied.

(15)
The phosphor wheel according to any one of (1) to (14), wherein a surface on which the phosphor layer is formed protrudes from a surface of the substrate.

(16)
The phosphor wheel according to any one of (1) to (8), wherein the plurality of heat dissipation fins are joined to both surfaces of the substrate.

(17)
The phosphor wheel according to (16), wherein, in accordance with a joint position of a heat dissipation fin joined to one surface of the substrate, a heat dissipation fin is joined to another surface of the substrate.

(18)
The phosphor wheel according to (16) or (17), wherein the plurality of heat dissipation fins joined to both surfaces of the substrate have an outward extending portion extending outward from an outer peripheral portion of the substrate, and a gap is formed between the outward extending portions.

(19)
The phosphor wheel according to any one of (16) to (18), wherein the phosphor wheel is a transmission-type phosphor wheel configured to transmit applied light, the substrate is formed of a light transmissive material, a heat dissipation fin joined to the substrate on an outside in a diameter direction with respect to a position where the phosphor layer is formed and a heat dissipation fin joined to the substrate on an inside in the diameter direction with respect to the position where the phosphor layer is formed are provided on at least one of one surface and another surface of the substrate, and the heat dissipation fins are placed in a position not overlapping with a light irradiation position of the phosphor layer when viewed in a direction crossing a surface of the substrate.

(20)
The phosphor wheel according to any one of (1) to (19), wherein the heat dissipation fin is formed of a carbon fiber-mixed shaped product.

(21)
The phosphor wheel according to any one of (1) to (8), wherein the phosphor wheel is a reflection-type phosphor wheel configured to reflect applied light, the plurality of heat dissipation fins include a first heat dissipation fin joined to an inner edge portion of the substrate and having an inward extending portion extending inward in a diameter direction of the substrate and a second heat dissipation fin joined to an outer edge portion of the substrate and having an outward extending portion extending outward in the diameter direction of the substrate, and a stress relaxation region is provided between a joint area of the first heat dissipation fin and a joint area of the second heat dissipation fin.

(22)
The phosphor wheel according to any one of (1) to (8), wherein the phosphor wheel is a transmission-type phosphor wheel configured to transmit applied light, and the substrate is formed of a light transmissive material, is joined to an outer edge portion of at least one of the plurality of heat dissipation fins, and extends outward in a diameter direction of the heat dissipation fin.

(23)
A light source apparatus including:
a solid state light source configured to emit excitation light having a first wavelength;
a phosphor wheel including
a disc-like substrate,
a phosphor layer formed on the substrate and configured to be excited by the excitation light and emit light having a second wavelength different from the first wavelength and to transmit part of the excitation light, and
a plurality of heat dissipation fins overlapping with each other when viewed in a direction orthogonal to a surface of the substrate; and
a motor configured to rotationally drive the phosphor wheel in a plane parallel to the surface of the substrate.

(24)
The light source apparatus according to (23), wherein the phosphor wheel is fixed to the motor via a heat insulating member.

(25)
A projection-type display apparatus including:
a light source apparatus;
a light modulation and synthesis system configured to modulate and synthesize incident light;
an illumination optical system configured to guide light emitted from the light source apparatus to the light modulation and synthesis system; and
a projection optical system configured to project an image emitted from the light modulation and synthesis system,
wherein the light source apparatus includes
a solid state light source configured to emit excitation light having a first wavelength,
a phosphor wheel including
a disc-like substrate,
a phosphor layer formed on the substrate and configured to be excited by the excitation light and emit light having a second wavelength different from the first wavelength and to transmit part of the excitation light, and
a plurality of heat dissipation fins overlapping with each other when viewed in a direction orthogonal to a surface of the substrate, and
a motor configured to rotationally drive the phosphor wheel in a plane parallel to the surface of the substrate.

(26)
The projection-type display apparatus according to (25), wherein the phosphor wheel is placed in the projection-type display apparatus, the projection-type display apparatus has an opening opened so as to allow the excitation light to be applied to the phosphor wheel, and a ventilation duct capable of supplying cooling air from an outside in a direction toward an outer periphery of the phosphor wheel is provided.

REFERENCE SIGNS LIST 1 projection-type display apparatus (projector)
10, 60 light source apparatus
32, 62 solid state light source
34 dichroic mirror
34a first surface
34b second surface
38, 70 condensing lens
40 motor
40a output shaft
50, 52 heat insulating member
80 ventilation duct
100, 100A, 100B, 200, 200A, 200B, 300, 300A, 300B, 400, 400A, 500, 600 phosphor wheel
110, 410, 510 light reflecting film
120, 420, 520 substrate
120a, 120b, 320a, 320b, 420a, 420b, 520a, 520b, 620a, 620b substrate surface
130, 330, 430, 530, 630 phosphor layer
140, 340, 440, 540 joining layer
150 heat dissipation structure unit
152, 354a, 354b, 454, 554 rising section
154a, 154b, 154c, 350, 350a, 350b heat dissipation fin
210 base unit
310 anti-reflection film
320, 620 light transmissive substrate
335, 680 dichroic mirror layer
352a, 352b, 452a, 452b, 552a, 552b outward extending portion
450a, 550a, 650a first heat dissipation fin
370a, 370b, 450b, 550b, 650b second heat dissipation fin
450c third heat dissipation fin
453 inward extending portion
640a first joining layer
640b second joining layer
A rotation axis
BL excitation light
WL white light

The invention claimed is:
1. A phosphor wheel, comprising:
a disc-like substrate;
a phosphor layer on the substrate; and
a plurality of heat dissipation fins, wherein a first fin of the plurality of heat dissipation fins overlaps with a second fin of the plurality of heat dissipation fins when viewed in a direction orthogonal to a surface of the substrate, wherein at least one of the plurality of heat dissipation fins has a rising section extending in a direction crossing the surface of the substrate.
2. The phosphor wheel according to claim 1, wherein a gap between the plurality of heat dissipation fins is opened in a direction toward an outer periphery of the substrate.
3. The phosphor wheel according to claim 1, wherein the plurality of heat dissipation fins is in a circle concentric with the substrate.
4. The phosphor wheel according to claim 1, wherein the substrate and the plurality of heat dissipation fins are joined by a thermally conductive adhesive layer.
5. The phosphor wheel according to claim 4, wherein the thermally conductive adhesive layer is elastic.
6. The phosphor wheel according to claim 5, wherein a thickness of the thermally conductive adhesive layer is in a range of 0.1 to 0.5 mm.
7. The phosphor wheel according to claim 1, wherein the at least one of the plurality of heat dissipation fins has the rising section in a shape of a circle concentric with the substrate, and wherein a third heat dissipation fin of the plurality of heat dissipation fins extends from the rising section.
8. The phosphor wheel according to claim 7, wherein a heat dissipation structure unit is integrally shaped to include the plurality of heat dissipation fins and wherein the rising section is on a side of a first surface of the substrate different from a second surface on which the phosphor layer is present.
9. The phosphor wheel according to claim 8, wherein the phosphor wheel is a reflection-type phosphor wheel configured to reflect applied light, and wherein the substrate comprises one of the plurality of heat dissipation fins constituting the heat dissipation structure unit.
10. The phosphor wheel according to claim 8, wherein the heat dissipation structure unit is a constituent part separate from the substrate, and the heat dissipation structure unit is joined to the substrate.
11. The phosphor wheel according to claim 8, wherein a rising position of the rising section is provided on the side of the first surface and the rising position corresponds to a position of the phosphor layer on the second surface.
12. The phosphor wheel according to claim 8, wherein, when a distance from a center of the substrate to an irradiation position of the phosphor layer is denoted by R and a diameter of a portion connecting the substrate and the rising section is denoted by D, a relation of

$$D/2 < R$$

is satisfied.
13. The phosphor wheel according to claim 1, wherein the plurality of heat dissipation fins are joined to a first surface of the substrate and to a second surface of the substrate.
14. The phosphor wheel according to claim 13, wherein, based on a joint position of a first heat dissipation fin joined to the first surface of the substrate, a second heat dissipation fin of the plurality of heat dissipation fins is joined to the second surface of the substrate.
15. The phosphor wheel according to claim 13, wherein each of the plurality of heat dissipation fins joined to the first surface and second surface have an outward extending portion extending outward from an outer peripheral portion of the substrate, and wherein a gap is between the outward extending portions.
16. The phosphor wheel according to claim 1, wherein the plurality of heat dissipation fins comprise a carbon fiber-mixed shaped product.
17. A light source apparatus, comprising:
a solid state light source configured to emit excitation light having a first wavelength;
a phosphor wheel including
a disc-like substrate,
a phosphor layer on the substrate and configured to excite by the excitation light and emit light having a second wavelength different from the first wavelength and to transmit part of the excitation light, and
a plurality of heat dissipation fins, wherein a first fin of the plurality of heat dissipation fins overlaps with a second fin of the plurality of heat dissipation fins when viewed in a direction orthogonal to a surface of the substrate, wherein at least one of the plurality of heat dissipation fins has a rising section extending in a direction crossing the surface of the substrate; and
a motor configured to rotationally drive the phosphor wheel in a plane parallel to the surface of the substrate.

18. The light source apparatus according to claim 17, wherein the phosphor wheel is fixed to the motor via a heat insulating member.

19. A projection-type display apparatus, comprising:
a light source apparatus;
a light modulation and synthesis system configured to modulate and synthesize incident light;
an illumination optical system configured to guide light emitted from the light source apparatus to the light modulation and synthesis system; and
a projection optical system configured to project an image emitted from the light modulation and synthesis system,
wherein the light source apparatus includes:
a solid state light source configured to emit excitation light having a first wavelength,
a phosphor wheel including:
a disc-like substrate,
a phosphor layer on the substrate and the phosphor layer configured to excite by the excitation light and emit light having a second wavelength different from the first wavelength and to transmit a part of the excitation light, and
a plurality of heat dissipation fins, wherein a first fin of the plurality of heat dissipation fins overlaps with a second fin of the plurality of heat dissipation fins when viewed in a direction orthogonal to a surface of the substrate,
wherein at least one of the plurality of heat dissipation fins has a rising section extending in a direction crossing the surface of the substrate, and
a motor configured to rotationally drive the phosphor wheel in a plane parallel to the surface of the substrate.

20. A phosphor wheel, comprising:
a disc-like substrate;
a phosphor layer on the substrate; and
a plurality of heat dissipation fins, wherein a first fin of the plurality of heat dissipation fins overlaps with a second fin of the plurality of heat dissipation fins when viewed in a direction orthogonal to a surface of the substrate, and wherein the plurality of heat dissipation fins are joined to a first surface of the substrate and to a second surface of the substrate.

* * * * *